G. O. DEGENER.
COMBINED TYPE WRITING AND COMPUTING MACHINE.
APPLICATION FILED OCT. 12, 1915.

1,278,445.

Patented Sept. 10, 1918.
15 SHEETS—SHEET 3.

WITNESSES
W. O. Westphal
Julius Duckstine

INVENTOR:
Gustave O. Degener
BY
D. C. Stickney
ATTORNEY.

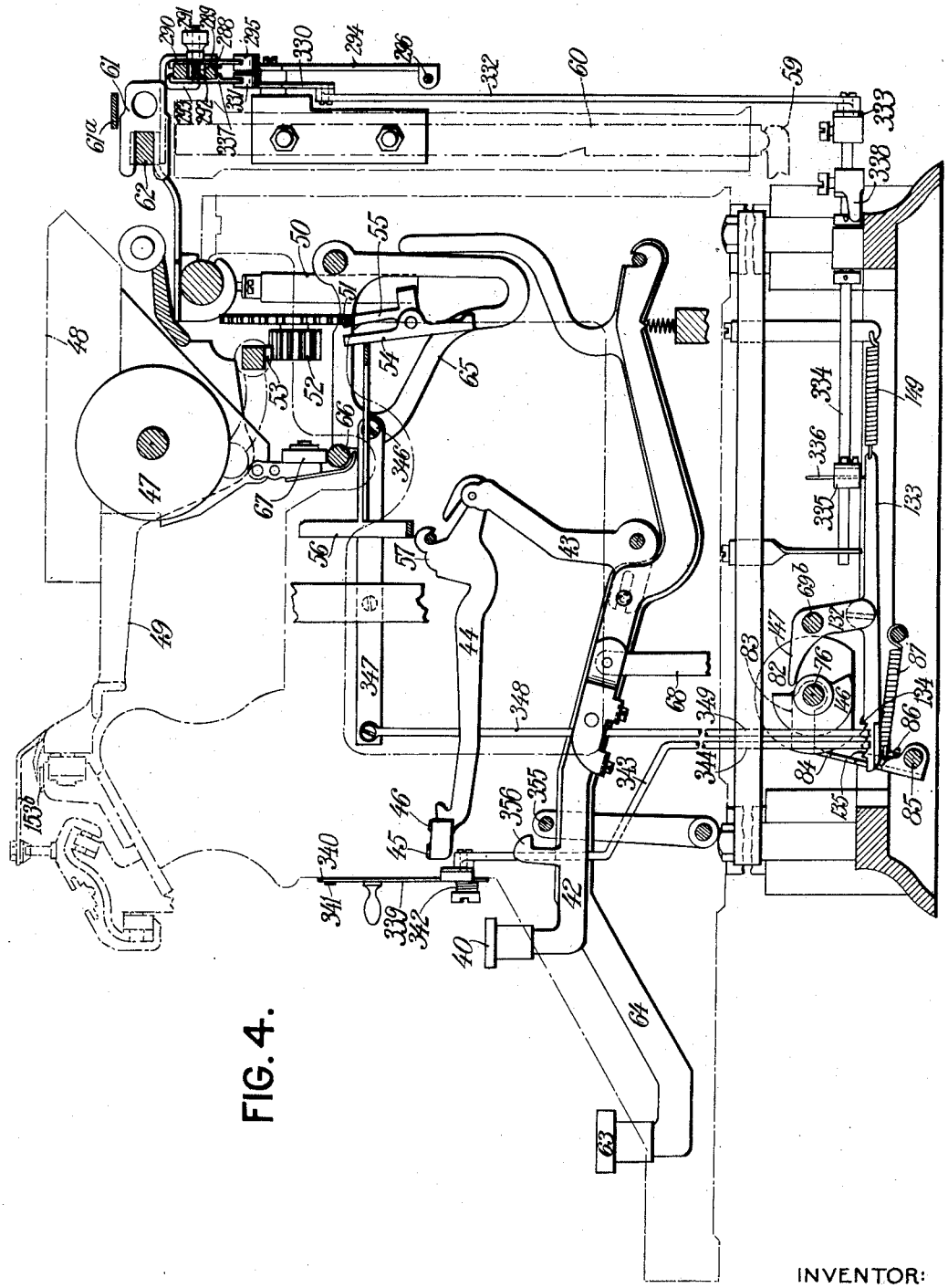

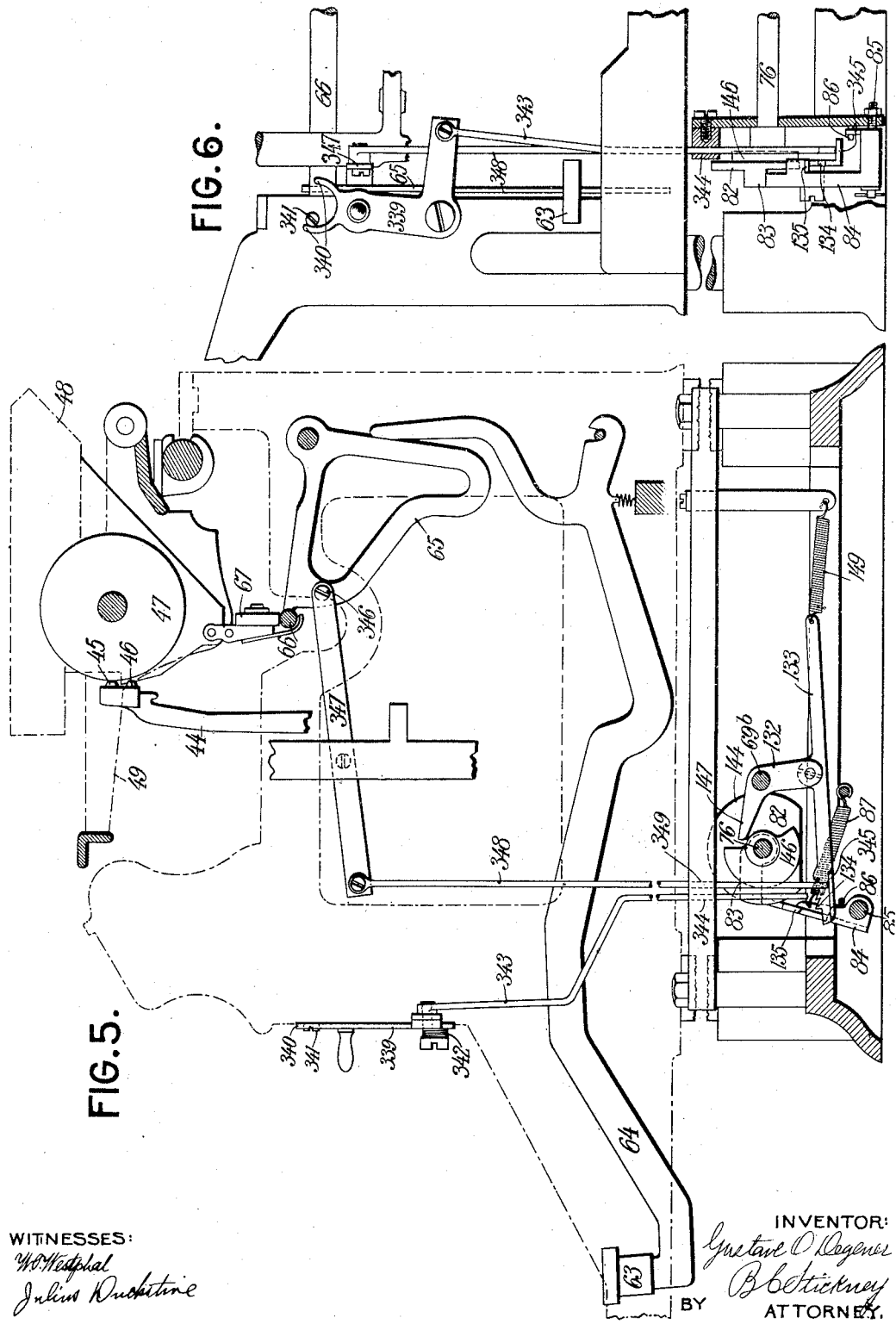

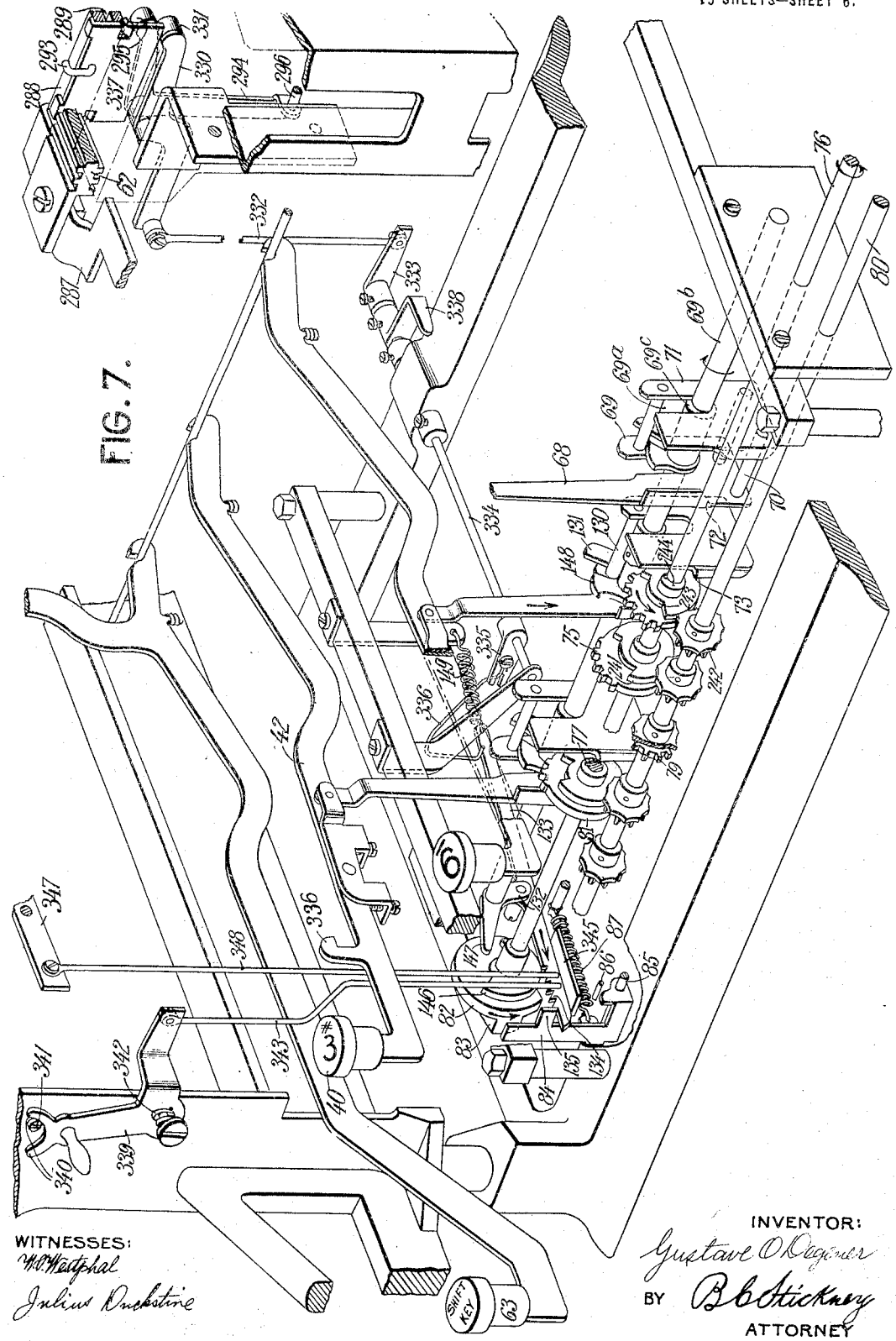

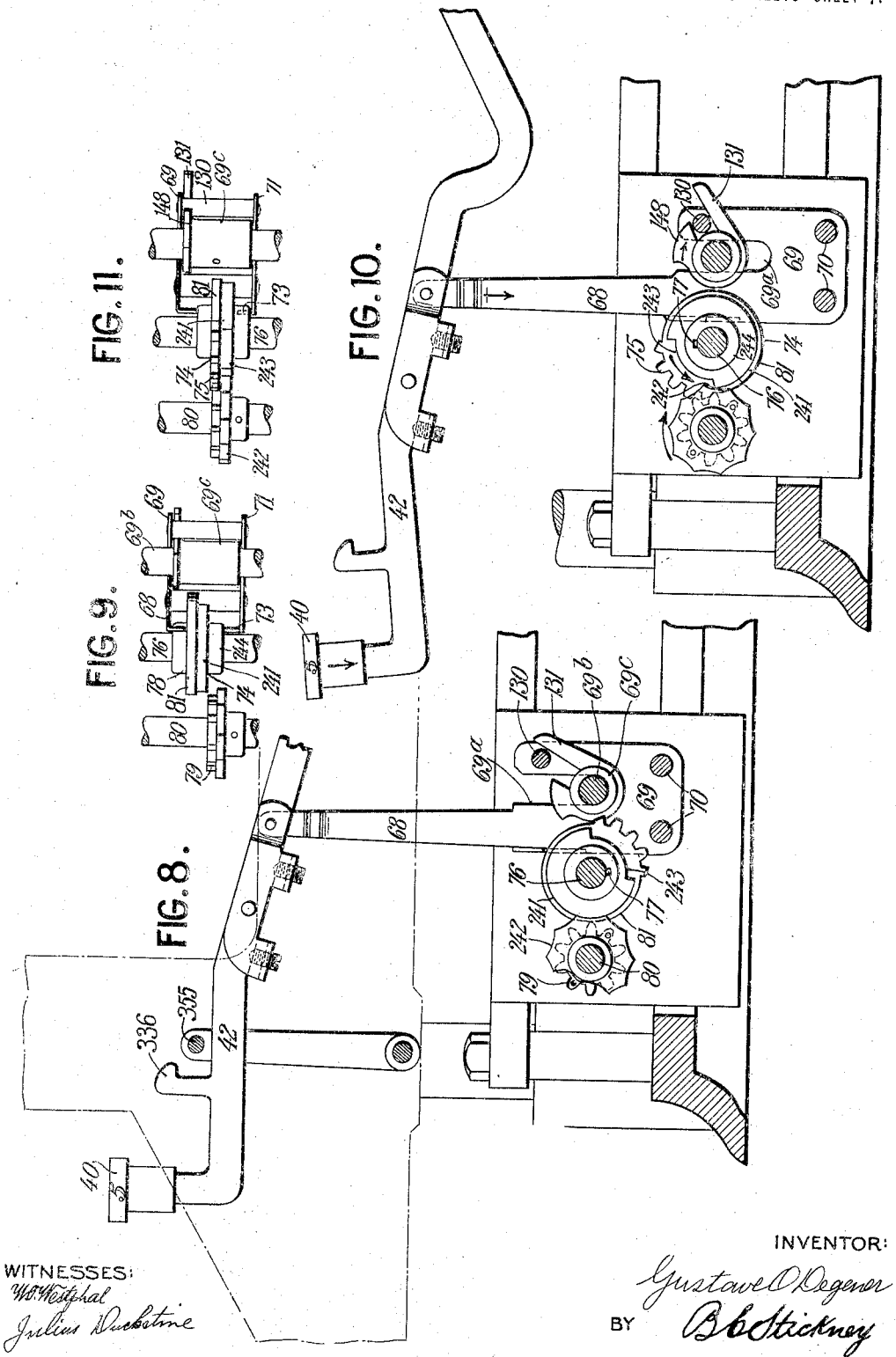

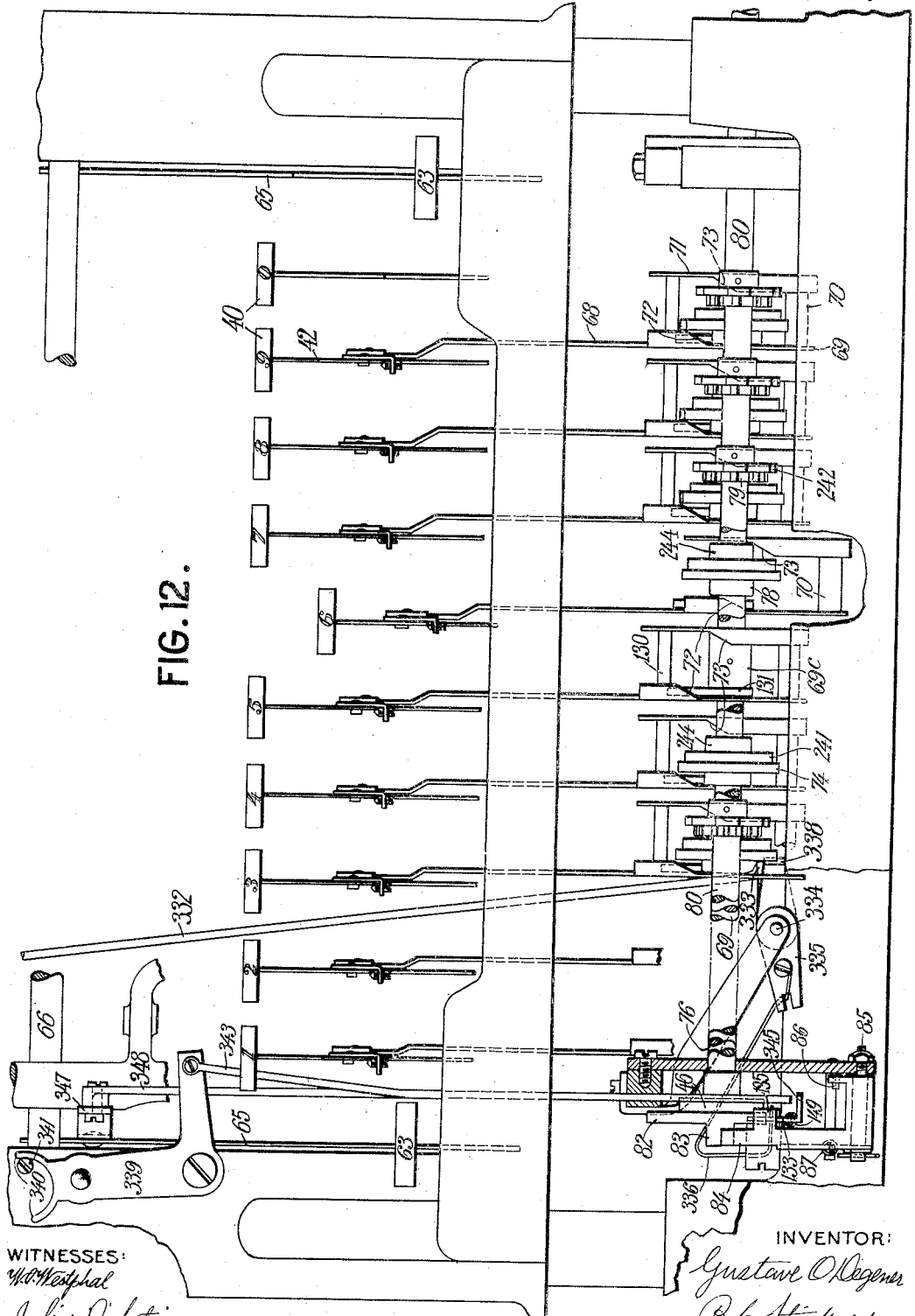

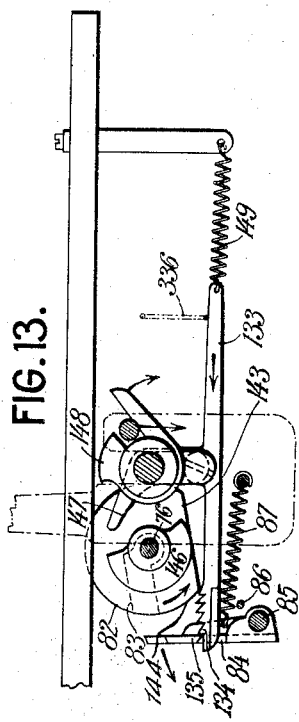

G. O. DEGENER.
COMBINED TYPE WRITING AND COMPUTING MACHINE.
APPLICATION FILED OCT. 12, 1915.
1,278,445.
Patented Sept. 10, 1918.
15 SHEETS—SHEET 10.
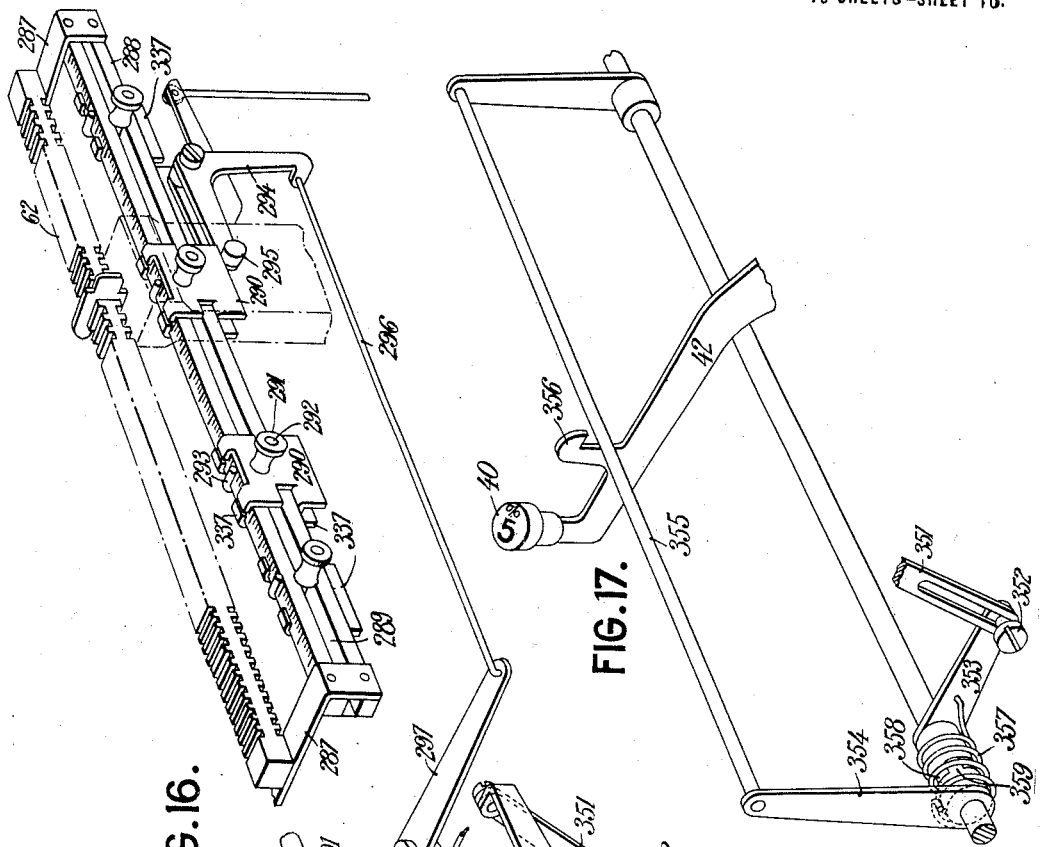

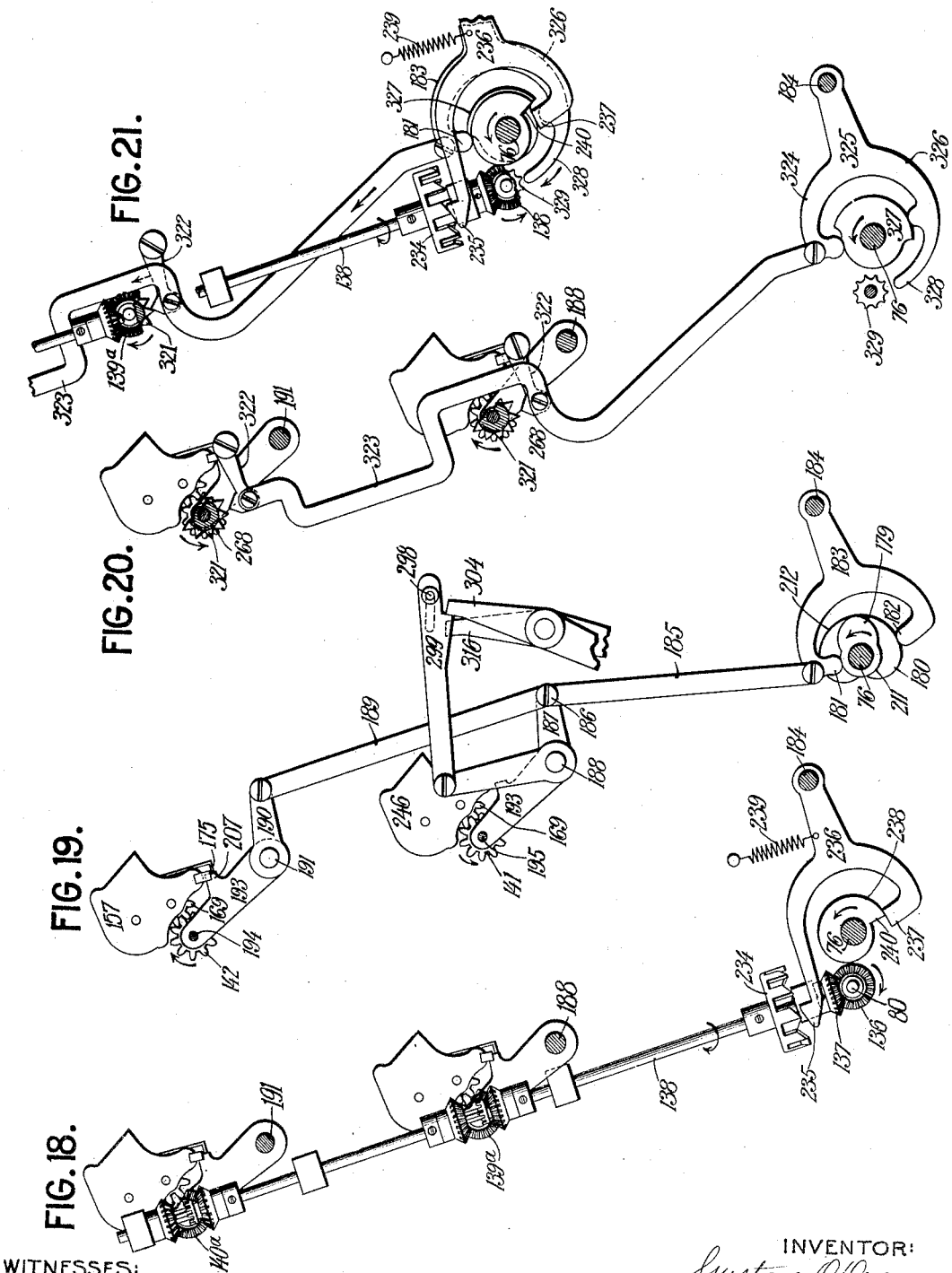

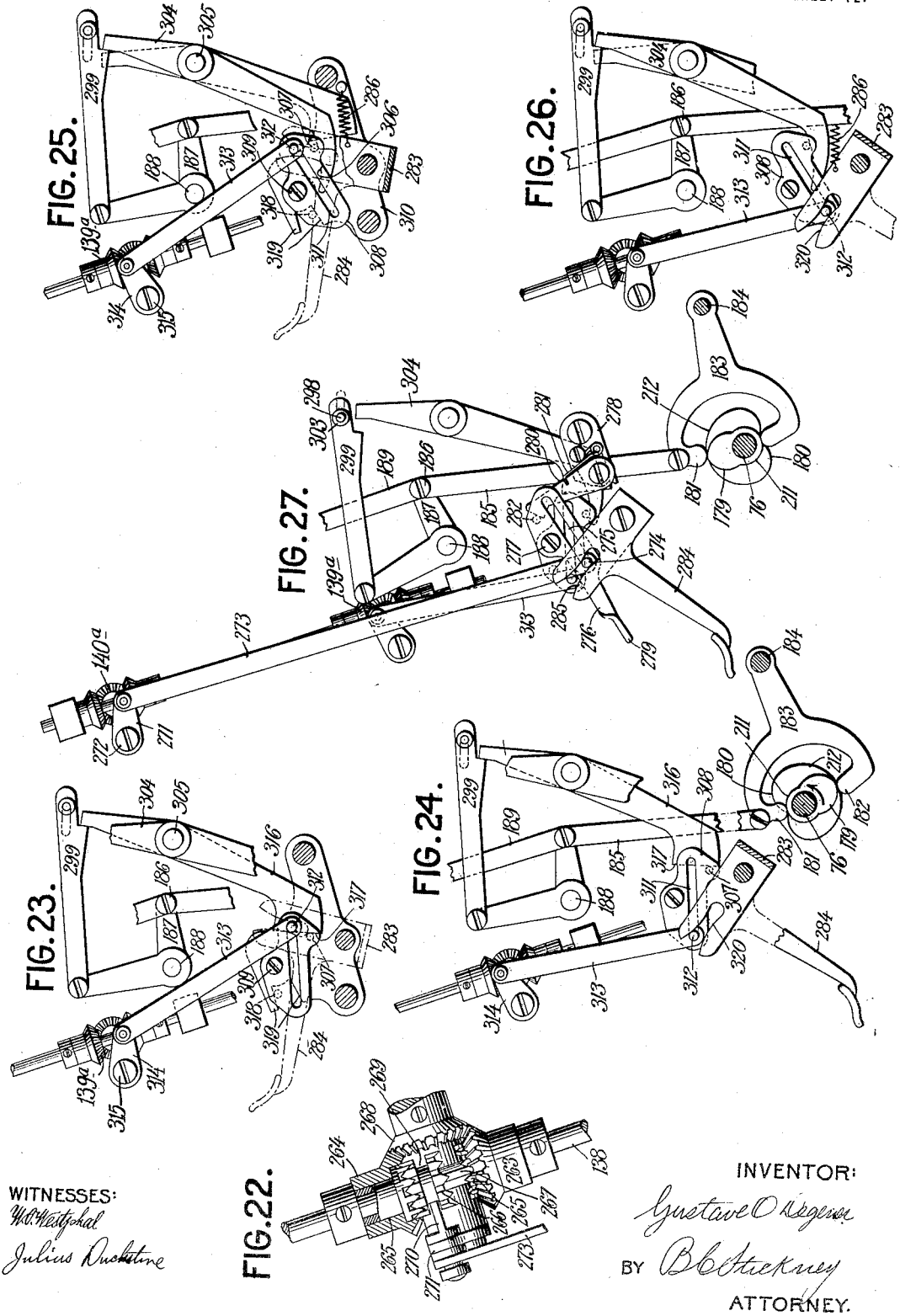

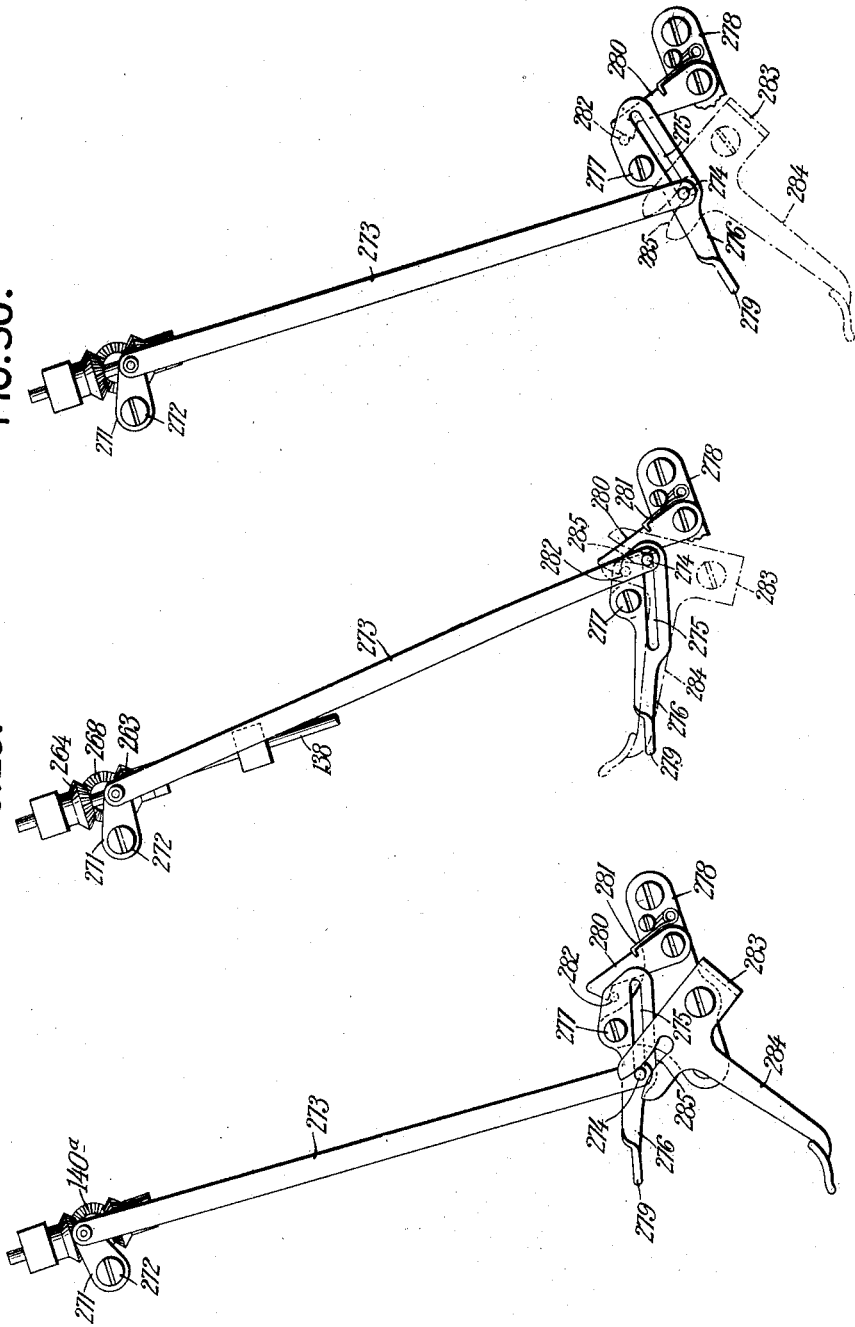

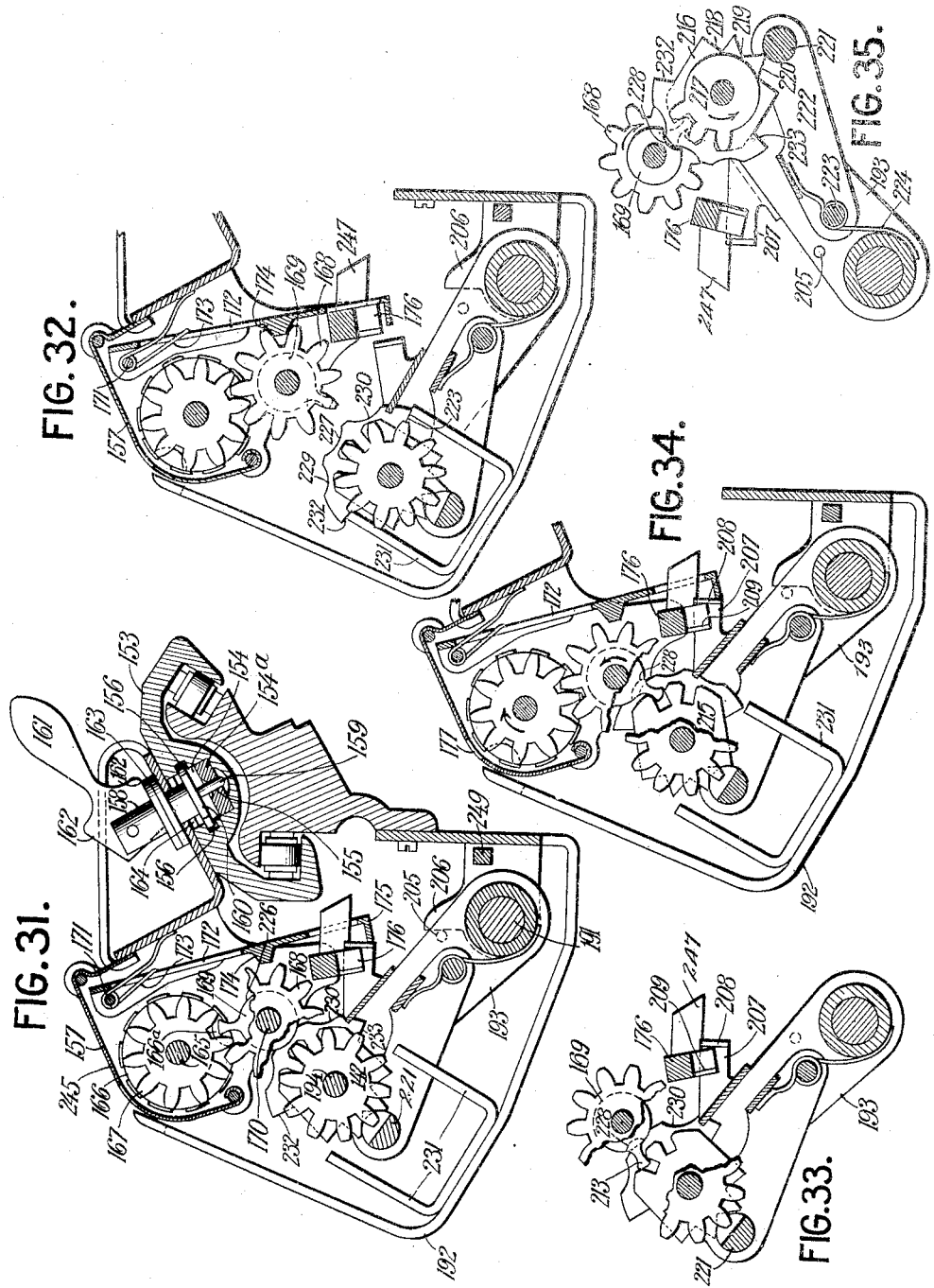

G. O. DEGENER.
COMBINED TYPE WRITING AND COMPUTING MACHINE.
APPLICATION FILED OCT. 12, 1915.
1,278,445.
Patented Sept. 10, 1918.
15 SHEETS—SHEET 15.
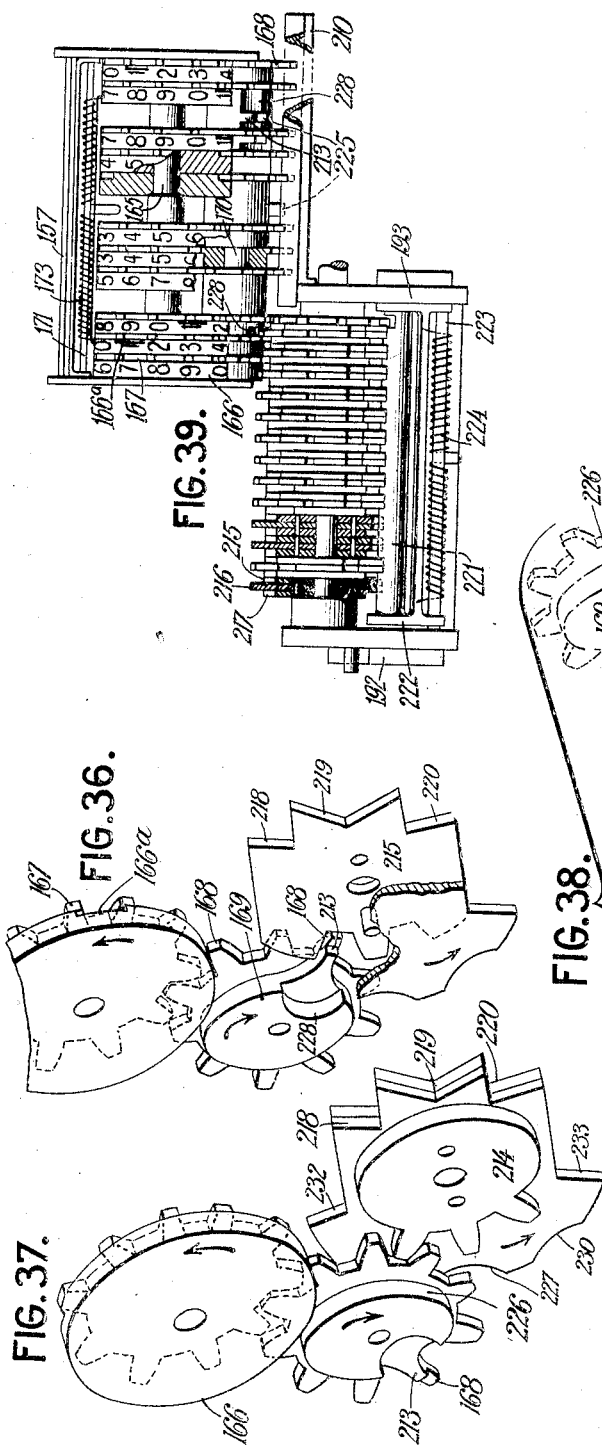
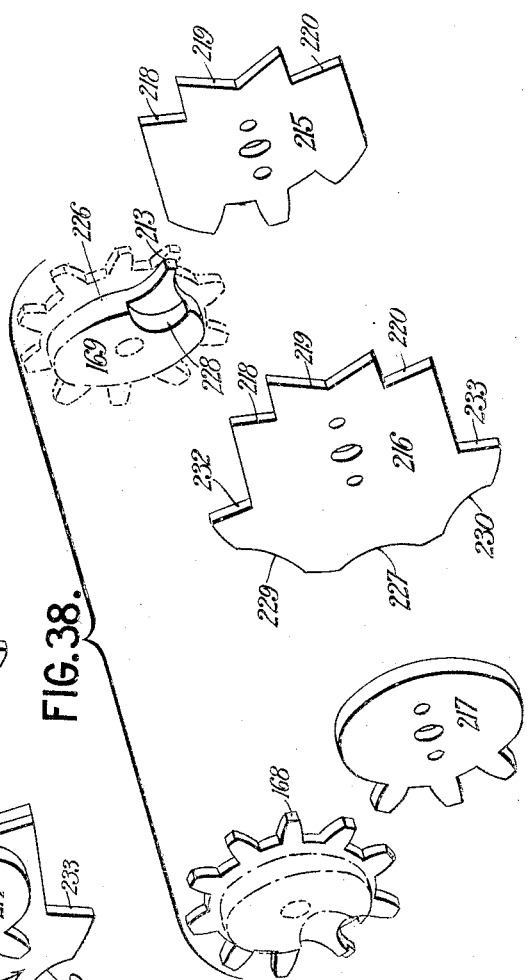
INVENTOR:
Gustave O Degener
BY B C Stickney
ATTORNEY.

UNITED STATES PATENT OFFICE.

GUSTAVE O. DEGENER, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,278,445.  Specification of Letters Patent.  Patented Sept. 10, 1918.

Application filed October 12, 1915.  Serial No. 55,448.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

My invention relates to computing machines, and is herein illustrated as applied to a combined typewriting and computing machine wherein the typewriter is an ordinary Underwood No. 3 typewriting machine comprising the usual alphabet and numeral keys, platen shift and decimal-tabulating mechanism.

One of the objects of my invention is to provide a machine in which the typewriting and computing is done without adding considerable extra load on the keys, so that the same may be operated by a typist of ordinary typewriting experience. Another object of the invention is the design of the computing mechanism of such a character as to eliminate many of the safety devices usually required, thereby reducing cost and complication. Another object is to so construct the registering mechanism and its driving mechanism so that the connecting and disconnecting of the driving mechanism from the registering mechanism is accomplished by a method allowing the greatest latitude in alinement. A further object is to have the register as small and light as possible, as the same must be moved step by step by the typewriter carriage. A further object is to provide a machine which can be readily restored, through a handle convenient to the operator, to an operative condition, should same become blocked through improper manipulation of the keys, as by striking two keys simultaneously or by striking keys at a comma-position of the register.

With these and other objects in view, I have found it advantageous to provide a machine in which certain parts of the computing mechanism are constantly under tension tending to drive them. With this end in view I have found it advantageous to connect a driving member to each one of the numeral keys, but to so connect said driving member that the numeral key is effective on it only to cause it to become an interponent between the power-drive and the totalizer in which the individual digits are added. Whenever a numeral key is depressed to throw its interponent into effective position, said numeral key may operate a universal bar which connects said key to the power-drive in such a way that the power-drive positively completes the depression of the key and holds the key depressed to its full extent while the digit represented by said key is being carried into the computing mechanism. This carrying-in of the digit, as indicated above, may be done by means of an interponent which is operated by the key, and I have found it advantageous to make such interponents in the form of gears, each gear having a number of teeth proportional to the digit or numeral key operating it. These interponents may be in the form of gears slidable on a universal shaft which forms part of the mechanism constantly under tension, and whenever any numeral key is depressed said shaft may rotate a full revolution, thus carrying all the interponents around with it. The interponents, however, normally being in ineffective position, only that interponent will compute which has been shifted to its effective position along said shaft.

I have found it possible to put a handle on this shaft for manually turning it, thus enabling the operator or typist to manipulate said shaft if any parts jam, and this manipulation, even if done blindly, will usually result in freeing the machine. If this handle is turned backwardly, it may release the key which has been depressed to do the computing, and erase whatever digit has been partially carried into the totalizer. Although this may result in letter-feeding of the carriage for one space, it leaves the totalizer mechanism precisely as it was before the error occurred, and the operative will see at once from the position of the typewriter carriage what was the nature of the error made, and to what point it is necessary to go back to correct the error. Such a feature is of course especially valuable on a visible writing machine like the Underwood typewriter, to which I have shown my invention as applied.

To accomplish these results I have found it advantageous to incorporate a spring motor in the machine, which constantly keeps the parts under tension, and to avoid the necessity of frequently winding up said motor, I have provided an electric motor which automatically winds said spring after it has partly run down. The capacity of the spring motor, however, is such that quite a computation can be carried on thereby without rewinding, thus often enabling a typist to finish up a given piece of work if the electric current should give out from any unexpected cause.

In machines as hitherto built, parts attached to the typewriter carriage were designed to coöperate with parts attached to or journaled on the typewriter frame, and such parts have frequently been found a source of disaster, because such parts sometimes fail to coöperate properly. Such failure to coöperate, if even to trivial extents, was likely to result in wrecking the machine. To avoid such troubles, I have found it advantageous to provide a totalizing mechanism in which the computing wheels are part of a totalizer structure, whereas the master wheel and carry-over devices form a structure which is normally entirely disconnected from the totalizer structure, but which becomes connected thereto every time a digit is to be computed. Such a structure permits the typewriter carriage to travel along freely at ordinary times, thus minimizing any possibility of wrecking various parts. Such a structure, in addition, permits a good many parts to be made much heavier for the purpose of greater strength, or much lighter for the purpose of ease and lack of shock in operating.

It has frequently been proposed to cause the typewriter carriage to shift the mechanism of a computing device from addition to subtraction in certain columns, and vice versa, and such connections may lead to the same kind of trouble which is indicated above as likely to occur between the totalizer and some coöperating parts. To avoid such troubles, I have provided a mechanism in which the travel of the typewriter carriage is normally without effect on the computing mechanism in any sense of the word, because the travel of the carriage in no way determines whether the machine shall add or subtract the numbers written. To relieve the mind of the operative of the need of remembering when to add and when to subtract, I have found it advantageous to provide an interponent connected to the typewriter carriage, such that whenever a numeral key is depressed the computing mechanism will automatically shift the connections in a manner determined by said interponent to cause the digit to be computed at the moment to be added or subtracted as the case may be.

In addition to this feature, there may be a totalizer which is manually settable to add or subtract. I have herein illustrated this adding and subtracting as being effected by clutches which are shiftable to either of two positions, one of which may be called the forward and the other the reverse position. The mechanism may be provided with another manual handle which is adapted to reverse said clutches from whatever position they have been occupying, and momentarily shift them to the reverse position. This I have been able to accomplish without altering the previous setting of said clutches except for the momentary action while the said second manual handle is effective.

I have found it possible to do away with many overthrow devices which it might be supposed were essential. For this purpose I have found it necessary to provide only a single pawl for arresting the master wheel shaft. This pawl may be thrown into effective position almost a full tooth before the pawl is intended to become effective, thus preventing overthrow and enabling more rapid operation of the machine than would otherwise be possible.

Other features and advantages will hereinafter appear.

In the accompanying drawings.

Figure 1 is a general fractional front elevation of the computing mechanism, with parts broken away for clearness.

Fig. 1ª is a fractional front view showing the pawl which connects the column and cross-totalizer carriages in the act of being disengaged prior to returning the cross-totalizer carriage to its normal position.

Fig. 4 is a sectional side elevation through the typewriter and part of the computing mechanism, showing the connections to the rear of the typewriter and part of the computer-releasing mechanism in normal position.

Fig. 5 is a sectional side elevation showing the typewriter platen in upper-case position, and the computer-releasing mechanism in ineffective position.

Fig. 6 is a fractional front elevation of the left side of the machine, showing the mechanism operator for manually rendering the computing mechanism ineffective.

Fig. 7 is a perspective view of the indexing and disconnecting mechanisms, with parts broken away for clearness.

Fig. 8 is a side sectional view through the indexing mechanism and its connection to a numeral key, in normal position.

Fig. 9 is a fractional plan view of the parts shown in Fig. 8.

Fig. 10 is a fractional side view of the indexing mechanism, similar to Fig. 8, showing the parts in a position when the numeral key is depressed.

Fig. 11 is a fractional plan view of the parts in Fig. 10.

Fig. 12 is a front view of the numeral keys and their connections to the indexing mechanism, with parts broken away to show the underlying structure, with the manual disconnecting mechanism in ineffective position.

Fig. 13 is a fractional side view of the computer-releasing mechanism just after the computing mechanism has been released by the depression of a numeral key.

Fig. 14 is a view similar to Fig. 13, showing the position of the parts in which a depressed numeral key is held down by the indexing mechanism.

Fig. 15 is a fractional side elevation of the computer-releasing mechanism, and its connections to the cams at the rear of the typewriter carriage.

Fig. 16 is a perspective view, looking from the rear, of the cams at the rear of the typewriter carriage, and their connections to the computing mechanism on the right side of the machine, and the automatic electric switch-operating mechanism and its connections to the key-locking mechanism.

Fig. 17 is a perspective view, looking from the rear, showing the universal key-locking bar and part of its connections to the switch-operating mechanism.

Fig. 18 is a side view of one of the mechanisms and associated parts to prevent overthrow at the end of a computation.

Fig. 19 is a side view of the mechanism for swinging the master wheels into mesh with their registers, showing the master wheels in their effective position.

Fig. 20 is a side view showing the mechanism for operating the overthrow-preventing detents for the master wheels and indexing mechanism.

Fig. 21 is a side view showing the parts in Figs. 18 and 20 near the end of a computation, and their relative positions.

Fig. 22 is a detail view of a change gear, looking from the rear, through which the master wheel is driven.

Fig. 23 is a side view showing the parts which automatically set the cross-totalizer to subtraction at the depression of a numeral key.

Fig. 24 is a side view of the parts shown in Fig. 23, with the reversing mechanism in effective position.

Fig. 25 is a side view similar to Fig. 23, but showing the parts set for addition.

Fig. 26 is a side view similar to Fig. 25, with the reversing mechanism in effective position.

Fig. 27 is a side view showing the reversing mechanism operated, and its effect upon the column and cross-totalizer mechanisms prior to the depression of a numeral key.

Fig. 28 is a side view of the manual setting mechanism for the column-totalizer in subtracting position, with the reversing mechanism in effective position.

Fig. 29 is a view similar to Fig. 28, showing the setting and reversing mechanisms in normal position.

Fig. 30 is a side view of the setting mechanism for the column-totalizers in adding position, with the reversing mechanism in effective position.

Fig. 31 is a side sectional view through the column-totalizer register lock, and carriage, showing the master wheel in effective position.

Fig. 32 is a view similar to Fig. 31, with the master wheel in its normal ineffective position.

Fig. 33 is a fractional view of the master wheel and tens-carrying mechanism in effective position, prior to a tens-carrying action, with parts broken away for clearness.

Fig. 34 is a view similar to Fig. 31, showing the parts just at the completion of a tens-carrying action.

Fig. 35 is a view similar to Fig. 33, but looking in the opposite direction, showing the parts during a tens-carrying action.

Fig. 36 is a skeleton perspective view of a dial wheel, a computing wheel, and a carry-over element, in a tens-carrying action, the parts being broken away for clearness.

Fig. 37 is a perspective view similar to Fig. 36, showing the dial and computing wheels of next higher denomination to those in Fig. 36, at the completion of a tens-carrying action.

Fig. 38 is a dissected perspective view of a computing wheel and a tens-carrying element.

Fig. 39 is a detail front view of the master wheel and carry-over mechanism in mesh with a register, and the computing wheel lock to the right of the master wheel, with parts in section to show the structure.

Figure 1:
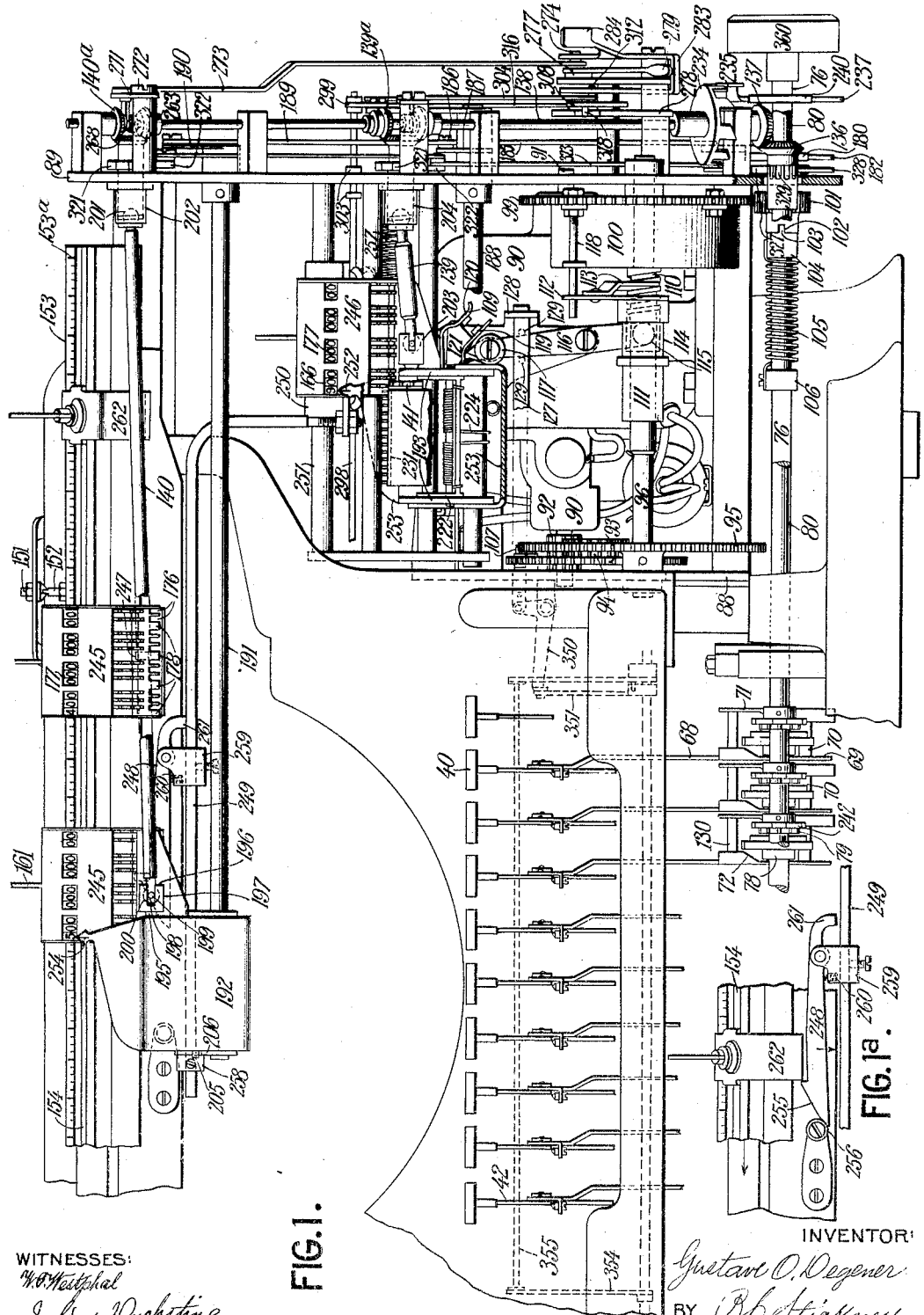

Numeral keys 40 and character keys 41 depress key levers 42 to rock bell-cranks 43, to swing type-bars 44 upwardly and rearwardly, to cause type 45, 46 thereon to print on the front side of a cylindrical platen 47 journaled on a platen frame 48 which is mounted on the traveling typewriter carriage 49 (Fig. 4). The carriage is constantly under the tension of a spring barrel 50 which tends to move the carriage in letter-feeding direction, said motion taking place at each depression of a key. The carriage is controlled in its step-by-step letter-feeding motion by the usual escapement wheel 51 on a pinion 52, meshing with a rack 53 connected to the typewriter carriage 49.

To permit the escapement wheel to turn, the dogs 54 and 55 are rocked at each depression of a key by a universal frame 56 which is moved rearwardly by a heel 57 on each type-bar, which strikes the universal frame each time a type prints on a worksheet wound around the platen.

Jump movements of the carriage 49 may also be obtained in addition to the step-by-step movements, for the purpose of rapidly positioning the typewriter carriage in and at a computing zone. For this purpose the machine may be provided with the usual Underwood decimal tabulating mechanism which includes keys 58 mounted on the front ends of key levers 59 (Figs. 3 and 4), which are pivoted intermediate their ends, the rear end of each of which is connected to raise its plunger 60 into the path of one of a plurality of stops 61 mounted on a rack bar 62, said stops being adjustable at letter-space intervals along the rack bar which forms part of the typewriter carriage 49. At the raising of any of the plungers 60, the rack bar 53 is disconnected from its pinion 52, by the usual carriage-release mechanism, not shown herein, thus releasing from the letter-feed escapement mechanism the carriage 49 which is rapidly drawn in letter-feed direction until arrested by one of the stops 61 thereon, striking against the raised plunger or counter stop 60.

The type-bars 44 for the keys 40 and 41 are each provided with two sets of type 45 and 46 so that they control selectively the writing of two different characters. On the numeral keys the digit types 46 are usually placed to print in lower-case position, while other characters are printed by the upper-case type 45. To effect the change from writing normally lower-case characters to writing upper-case characters the platen 47 is mounted to be shifted from a lower-case position to an upper-case position. For this purpose there is provided a shift key 63 on a lever 64, the rear end of which engages a shift frame 65 pivoted on the frame work of the typewriter and provided with a horizontal rail 66 on which rests a roller 67 mounted on the platen frame 48. On depression of said shift key the rail 66 is caused to move upwardly, thus raising the platen frame 48 to bring the printing line of the platen 47 opposite the upper-case type 45 on the type-bars 44 when the latter are swung to their printing position.

To control the computing mechanism, each numeral key lever 42, except the zero key lever, (Figs. 1, 7, 8, 10, and 12) near its forward end has pivotally connected thereto a pendant or thrust link 68, the lower end of which is formed in the shape of a plate 69, to the right of which is fastened by means of rods 70 a plate 71 of the same shape as and directly opposite the plate 69. The zero key-lever is not connected to the computing mechanism since it is only necessary to print and letter-space when zero is computed. The plates 69 and 71, have cams, 72 and 73 respectively, formed at their forward ends (Figs. 7, 9, and 11) which straddle a sliding indexing member 74, normally in ineffective position (Fig. 9), and are guided by slots 69ª cut in the cam frame 69, 71. A universal rock shaft 69ᵇ passes through the slots of all the cam frames. The ends of sleeves 69ᶜ fast on the rock shaft, steady the cam frames when sliding an interponent 74 into or out of effective position. There are nine of these indexing members 74, one for each of the numeral keys from "1" to "9," each of said interponents being provided with gear segment wheels 75, the number of teeth thereon varying according to the values of the associated numeral keys. The indexing members 74 form interponents which are slidingly mounted on a normally power driven shaft 76, but are caused to rotate with said shaft by a key 77 fast thereon (Figs. 7, 8, and 10). On the depression of any numeral key its cam 72 acting against the left hub 78 of the interponent 74 moves it rightwardly to aline the gear segment 75 thereon with one of a series of nine gear wheels 79, all of which are fast on a shaft 80, journaled in the framework in front of the shaft 76. Each of the gear segments or wheels 75 has a smooth portion 81, and this is the part of the wheel brought opposite the associated gear wheel 79 at the depression of a numeral key, so that when it revolves each wheel 75 has some idle movement before the teeth thereof come into driving engagement with the gear 79. The extent of this idle movement is greatest for the "1" key and smallest for the "9" key. The segments 75 are so arranged on the power driven shaft 76 that the various segments 75 will begin to impart rotation to the gears 79 at various points in the rotation of the segments, depending upon the amount of idle motion provided by the smooth surfaces 81, but said shaft will cease to impart rotation to the gears at the same point in its rotation for each segment, thus providing a different amount of idle rotation for each of the segments 75 before their engagement with their respective gears 79 and a uniform amount of idle motion of said segments after the gears 79 have ceased rotating. The object of the latter provision is to make possible the operation of a highly efficient overthrow-preventing mechanism as will hereinafter appear.

In the normal operation of the machine the shaft 76 turns in counter-clockwise direction (in Figs. 7, 8 and 10), but is normally held against said turning because on the left end of the shaft 76, (Figs. 4, 5, 6, 7, 12, 13, 14, and 15) is fast a cam disk 82 which has a projection 83 formed on its left side to engage a pawl 84, pivoted on the framework at 85, and drawn against a stop 86 by a spring 87, so that the end of the pawl will normally lie in the path of the projection 83, thus preventing any counter-clockwise rotation of the cam disk 82 and associated parts (Figs. 4, 5, 6, and 15) until the end of said pawl has been moved out of the path of said projection 83 (Figs. 7 and 13) by mechanism hereinafter described.

The machine is indirectly driven by an electric motor, through a spring which stores power from said motor. For this purpose on the base of the machine to the right of the typewriter framework are fast two vertical plates 88 and 89, between which is mounted the driving mechanism of the computing machine (Figs. 1, 2, and 3), which consists of an electric motor 90, the main or drive shaft 91 of which is its commutator shaft and is journaled at its ends in the plates 88, 89 (Fig. 1), and carries a spur pinion 92 near its left end in mesh with a spur gear 93 mounted on a stud on the right side of the plate 88. The gear 93 has fast on its left side and concentric therewith, a pinion 94 meshing with a gear wheel 95 fast on the left end of a shaft 96, the ends of which are journaled in the side plates 88, 89. On the right end of said shaft is fast one end of the spiral spring 97 which stores up the motor power. The other end of this spring is fast to a cylindrical casing 98, which incloses said spring and is rigidly mounted on a gear wheel 99, said casing and gear wheel being loosely mounted on the shaft 96. The spring 97, casing 98 and gear wheel 99 constitute a spring motor 100 (Figs. 1 and 3), the gear wheel 99 of which is in mesh with a pinion 101 loosely mounted on the shaft 76, said pinion having a groove 102 cut therein, into which is fitted a tongue 103 formed on a collar 104, on which is fast one end of a coil spring 105, the other end of which is fast to a collar 106 fast on the shaft 76. Therefore any rotation the spring motor 100 may impart to the pinion 101 will be transmitted through the spring 105 to the shaft 76 and associated parts, the spring acting as a shock-absorber, prolonging the life of the indexing mechanism and avoiding wreckage of the parts.

Figure 2:
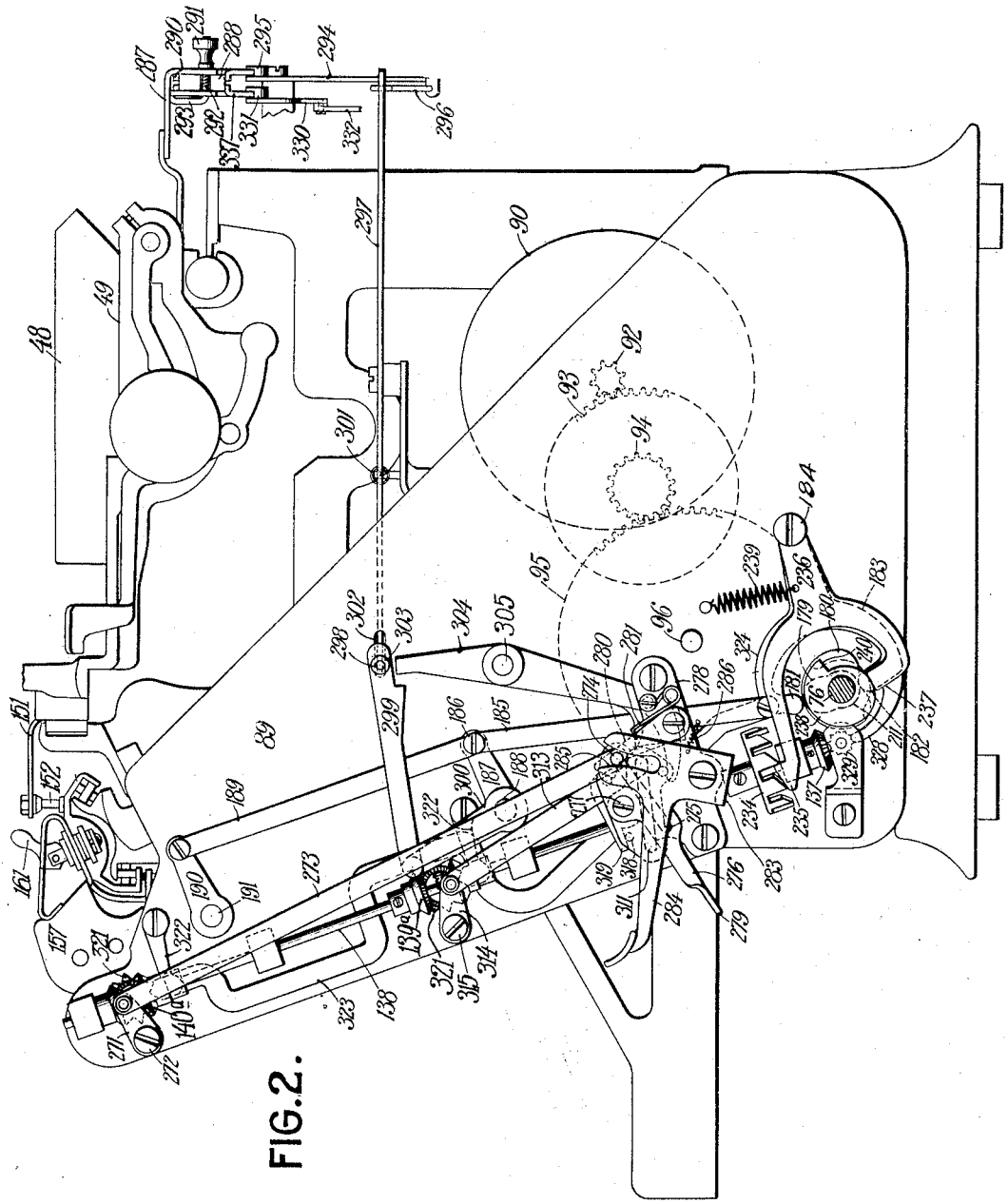
Fig. 2 is a general side elevation of the computing mechanism on the right side of the machine in normal position, the column totalizer being set for addition.
Figure 3:
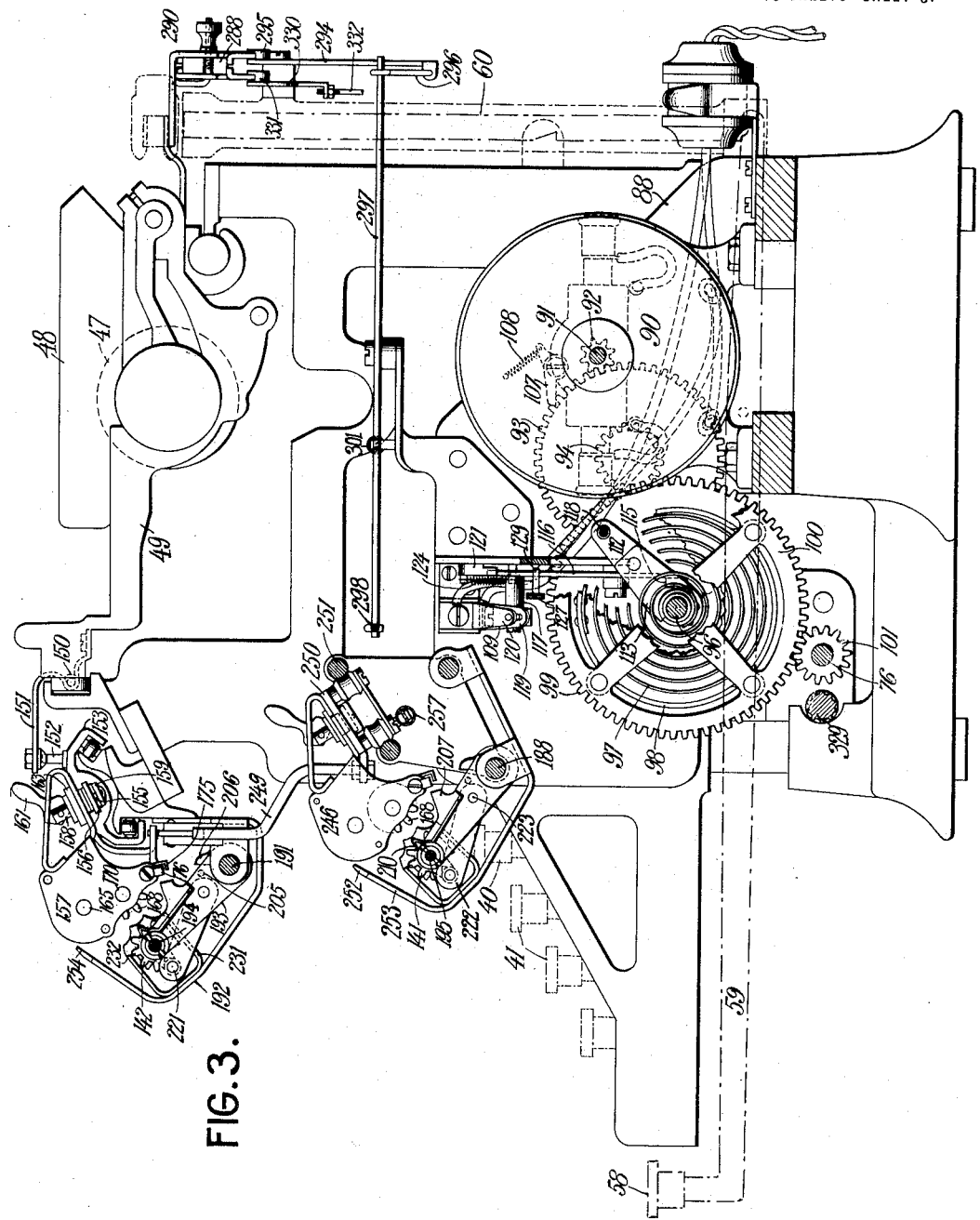
Fig. 3 is a sectional side elevation showing the master wheels in normal ineffective position, and the spring motor and its gearing.

The electric motor 90, through the intermediary of the gears 92, 93, 94, and 95, rotates the shaft 96 in a clockwise direction, as seen in Figs. 2 and 3, to wind up the spring 97 which therefore exerts a continual torque on the shaft 76 in a counter-clockwise direction, but said shaft is prevented from rotating by the pawl 84, which normally stands in the path of the projection 83 on the cam disk 82. In order to prevent the spring motor 100 from turning the electric motor backward, there is mounted on the right side of the plate 88 a pawl 107, one end of which is held in the path of the teeth of the gear wheel 93 by a spring 108, so as to enable said gear to rotate when driven by the electric motor and to prevent said gear from rotating when driven by the spring motor, thus preventing the unwinding of said spring motor through the gearing between it and the electric motor 90. The gearing pawl, and spring between the electric and spring motor, may have substituted for it a worm and worm gear drive to simplify the structure and reduce vibration.

The electric motor 90 is adapted to be rotated only when the spring motor 100 has become nearly exhausted. For this purpose, there is provided mechanism to automatically close the electric switch 109 between the source of electric power and the motor 90, when the spring motor 100 has become exhausted and to automatically open said switch when sufficient power from the electric motor has been stored in the spring motor. On the shaft 96, to the left of the spring motor casing 98, is formed a spiral groove 110, on which is loosely mounted a sleeve 111 carrying an arm 112 on the right end thereof, on which is fast a fork, the ends 113 of which project into the spiral groove 110. The lead of the spiral groove 110 is such that the clockwise rotation of the shaft 96 during which time the spring motor is being wound up, will cause the sleeve 111 to travel rightwardly along the shaft 96, and travel leftwardly along the shaft when the spring of the motor is being unwound. The sleeve 111 has an annular groove 114, either side of which is adapted to engage a roller 115 on the lower end of a tappet in the form of a lever 116 of the first order, the upper end of which carries an electrically insulated roller 117. When the spring motor 100 has its full amount of power stored therein, the sleeve 111 will be in its extreme rightward position, as seen in Fig. 1. As the spring motor 100 rotates to transmit rotation to the shaft 76, an arm 118, fast to the casing 98 of the spring motor and passing through a hole in the arm 112, will transmit rotation to the sleeve 111, causing it to rotate with the spring motor and to slide leftwardly along the shaft 96 as the spring of the motor 100 becomes unwound. It does this because the spiral groove 110 on the shaft 96 is held stationary by the pawl 107 and the forked ends 113 are rotated in said spiral groove, giving, in effect, a screw and nut action. During said leftward motion of the sleeve 111, the side of the groove 114 will carry the roller 115 to swing the lower end of the lever 116 leftward, causing the insulated roller 117 to ride under a lower flexible electric switch terminal 119 of the switch 109, to cause said terminal to come into contact with an upper flexible terminal 120 of said electric switch. These are the terminals of the electric feed wires of the motor 90, and the electric main feed wires, and therefore when in contact close the circuit through the motor, causing the motor to rotate and wind up the spring of the spring motor 100. In order to reduce to a minimum the electric arcing between the switch terminals 119 and 120, when the switch is closed and opened, the lever 116 is pointed at its upper end and to obtain a snap action coöperates with a pawl 121 on a fixed pivot, the forward end of which has two adjacent cam surfaces formed thereon 122 and 123, said pawl being pressed downwardly by a spring 124, so that one or the other of the cam surfaces on said pawl is always in contact with the upper end of the lever 116, and tends to force the upper end of said lever in one or the other direction (Figs. 1 and 16). During the hereinbefore described leftward movement of the sleeve 111, the upper end of the lever 116 forces the pawl 121 upwardly against the tension of its spring 124 while acting on its cam surface 123. When the upper end of the lever 116 passes from the cam surface 123 to the adjacent cam surface 122 (where it is in Fig. 16), said cam surface 122 throws the upper end of said lever well toward the limit of its right hand throw, as seen in Fig. 1. This forces the roller 117 against the under side of the terminal 119, causing said rather flexible terminal to contact with the terminal 120, which is also rather flexible, and forcing both terminals upwardly. To effect this operation, the end of the terminal 119 is turned downwardly to form a cam against which the roller 117 bears in its right-hand position, thus raising it in the manner described. In its left-hand position, the roller 117 is clear of the terminal, thus allowing it to spring clear of the terminal 120. Sufficient lost motion is provided between the sides of the groove 114 and the roller 115 to enable the lever 116 to swing independently of the sleeve 111. The object of this lost motion is to enable the spring 124 to force its pawl 121 rapidly downward when the point of the lever 116 has passed from the cam 123 to the cam 122, thus enabling said lever to close the switch 109 quickly enough to minimize the amount of electric arcing between the terminals of said switch. The electric circuit through the motor 90 having thus been closed, the motor, through the gears 92, 93, 94, and 95, will rotate the shaft 96 to wind the spring of the motor 100 and to cause the sleeve 111 to move rightwardly along said shaft. During this rightward movement of the sleeve the left side of the groove 114 will engage the roller 115 and swing the upper end of the lever 116 leftwardly, said upper end of the lever now acting on the cam surface 122 to force the pawl 121 upwardly against the tension of its spring until the upper end of the lever has passed onto the cam surface 123 of the pawl, thus enabling the pawl 121 to quickly swing the upper end of the lever and its electrically insulated roller 117 away from the switch terminals 119, 120, which normally tend to keep separated as seen in Fig. 1. This breaks the electric circuit through the motor 90, which by this time has stored sufficient power in the spring motor 100 to enable it to actuate the computing mechanism. During that part of the leftward movement of the upper end of the lever 116, when its point is passing over the cam 122, the terminals of the switch 109 will remain closed, due to the flexibility of said terminals and the fact that both of said terminals have been forced upwardly at the time electric contact was made. The motion of the lever 116 is arrested by two pins 125 and 126, on a slide 127, one end of which is mounted in the side plate 88, and the other end of which is mounted in the bracket 128 on which is pivoted both the lever 116 and the pawl 121, said bracket being fast on the side plate 88. The right end of the slide 127 (Fig. 1), carries two pins 129, which straddle the upper end of the lever 116, so that motion from the lever may be transmitted to the slide to cause said slide to reciprocate, and the pins 125, 126 on said slide 127 being on either side of the plate 88 will alternately abut against the sides of said plate to limit the motion of the slide 127 and connected lever 116 in either direction.

Supported between the plates 69 and 71 of each thrust link 68, are horizontal bars or extensions 130, which normally lie in the path of arms or extensions 131 (one for each numeral key from "1" to "9"), fast on the universal rock shaft 69$^b$, said shaft adapted to trip the spring motor 100. To do this the shaft 69$^b$ has fixed thereto at its left end, a bell-crank 132, on the depending arm of which is pivoted a trip arm or universal bar 133, the forward end of which has teeth 134 formed thereon, adapted to engage on the forward stroke a tooth 135 on the pawl 84, there being provided a plurality of teeth 134 to insure the tripping of the pawl, said teeth being so shaped as to be ineffective on the return stroke of the trip arm 133. The connections are such that at the depression of any numeral key the cross bar 130 engages the extension 131, and causes the rock-shaft 69$^b$ to rotate in clockwise direction (Figs. 13, 14, 15, etc.), which rotation causes the depending arm of the bell-crank 132 (Fig. 13) to move forwardly, carrying with it the bar 133, the teeth 134 of which engage the tooth 135 of the pawl 84, swinging said pawl outwardly to cause the upper end thereof to move from under the projection 83 on the cam disk 82, thus releasing said cam disk, which is constantly under the rotative influence of the spring motor 100 through the intermediary of the pinion 101 and spring 105. The shaft 76 is now free to rotate, and carries with it all the segments 75, with the result that the segment which has been brought into meshing relation with its one of the gears 79 by the depression of its numeral key will drive its gear 79 fast on the shaft 80. The computing is done by this shaft and for that purpose there is fast upon the right end of said shaft a bevel pinion 136, meshing with a bevel pinion 137 fast to the lower end of an upright shaft 138 mounted in suitable bearings on the plate 89. Midway between the ends of said shaft, and also at its upper end, is provided suitable gearing through which the rotation imparted to said shaft may be transmitted to horizontal shafts 139 and 140 which drive master wheels 141 and 142 respectively to operate the registers of the computing machine.

The cam disk 82 is provided with a flat portion 143, which normally overlies the forward end of the universal bar 133, and is also provided with a cam portion 144, which, when the disk rotates, engages and depresses the forward end of the universal bar so that its teeth 134 will be forced out of engagement with the tooth 135 of the stop pawl 84, enabling the pawl to be returned to normal position by its spring 87 (see Figs. 13 and 14), so that said pawl will arrest the shaft 76 by the projection 83 at the end of one revolution.

The machine cannot compute without printing, and for this purpose there is formed on the right side of the cam disk 82 a cam 146 fast to the shaft 76, in the path of which lies an arm 147 of the bell-crank 132, which is swung to the Fig. 13 position at the depression of any numeral key, and is swung further by the cam 146 during the rotation of the shaft 76, to the position seen in Fig. 14. Each arm 131 is provided with a projection or extension 148, which passes over the horizontal bar 130 of its numeral key at each depression thereof, and remains in said position until the cam 146 engages the arm 147 of the bell-crank 132 to raise said arm from the Fig. 13 position to the Fig. 14 position. The extra rotation imparted to the shaft 69$^b$ by this cam action causes the projection 148 to engage the horizontal cross-bar 130, as seen in Figs. 10 and 14, and thus draw downwardly the pendant link 68 and its connected numeral key, thereby completing the stroke of the numeral key and connected parts to cause the type 46 to print in case the operator has failed to properly depress the numeral key. The depressed key is held in its depressed position by the projection 148 until the high part of the cam 146 has passed from under the arm 147, as seen in Figs. 5 and 15, at which time a spring 149, one end of which is connected to the rear end of the universal thrust bar 133, draws said thrust bar rearwardly to its normal position and with it the bell-crank 132, causing the rock-shaft 69$^b$ to swing in counter-clockwise direction to return the extensions 148 to their normal position and release the depressed numeral key, said release being aided by the power of the spring 149 forcing the extension 131 upwardly which acts on the bar 130 to force the pendant 68 and connected numeral key upwardly which return motion is completed by the usual key lever springs (Figs. 4, 8, and 10). This mechanism is utilized to prevent the depression of any numeral key after one, already partly depressed, has started a computation, unless the latter has completed its computation and is released from its computation devices. This is obtained by the fact that when any arm 131 and its numeral key are held in depressed position by the cam 146, as in Fig. 14, all the projections 148 on the arm 131 will lie in the path of all the horizontal bars 130, connected to the numeral keys which have not been depressed, so that the partial depression of any one of the latter will cause its cross-bar 130 to strike the underlying projection 148. This prevents the complete depression of any other numeral key during the time that any depressed numeral key is held in its depressed position by the cam 146 holding one of the extensions 148 on an arm 131 over its depressed cross-bar 130, viz., until the first depressed key is released at the return motion to normal position of the extension 148, at which time the typewriter carriage will move one space in letter-feed direction, after which any key may be depressed.

To locate the registers at any desired point at letter-space intervals along the writing line, so that the registers will be placed in proper meshing relation with the master wheel, and in coincidence with the computing column-space on the work-sheet on the platen 47, there is hinged at 150, at the front of the typewriter carriage 49 a forwardly extending arm 151, the forward end of which is spring-pressed downwardly to engage a pin 152 on a column-totalizer carriage 153 which is slidingly mounted on the front of the typewriter framework, and may be moved from left to right in letter-feed direction with the typewriter carriage 49. Extending along the entire length of the column-totalizer carriage is a groove 154, in the bottom of which is fast a bar 154$^a$ adjustable lengthwise of the groove, and contains holes or apertures 155 at letter-space intervals extending throughout the entire length of the groove 154, in the sides of which, and extending the entire length of said groove are cut two grooves 156. Loosely mounted in the casing 157 of each register is a plunger 158, the lower end of which has a pin 159 formed thereon which may be inserted into any of the holes 155 to locate the registers, the lower end of the plunger also carrying an elongated disk 160 adapted to pass into the groove 154. When a handle 161, pivoted at the top of the plunger 158 is positioned lengthwise of the register after the insertion of said plunger and pin 159 into one of the holes 155, and then is turned crosswise of said register, the elongated ends of the disk 160 will pass into the groove 156 so that when said handle 161 is pressed down till one of the sides 162 thereof is pressed down on a spring-washer 163, it will cause the disk 160 to engage the sides of the slot 156 and lock the register in the selected position. The register cannot be unintentionally dislocated since the pin 159 on the plunger 158 is of sufficient length to remain in its hole 155 when the handle 161 and connected plunger is accidentally loosened. To prevent the registers from turning around their pins 159, their casings are provided with lugs 164 placed on either side of the plunger 158 and extending into and across the groove 154 to hold the registers in proper alinement with their carriage. Fast to the sides of the casing 157 of each register and extending therebetween is a rod 165 on which are loosely mounted dial wheels 166, each carrying the numerals "0" to "9" on their peripheries and have gears 167 fast on their right side which mesh with gears 168 on the computing wheels 169 on a shaft 170 parallel with and mounted like the shaft 165 on the register casing. To hold the gears 168 and their meshing dials 166 in alinement and against accidental rotation when the registers are removed from the machine or are not being operated, there is pivoted at 171 between the sides of the casing 157 a plate 172 pressed forwardly by a spring 173, so that a V block or detent 174 extending horizontally the entire length of the register and plate 172, adapted to engage the teeth of the computing gears 168. In order to enable the operator to read the totals indicated by the registers at the end of, or during any computation, the front of the register casing 157 has a sight-opening 177 cut therein through which may be seen one of the numerals of each of the dial wheels 166, which may be placed adjacent to each other at letter-space intervals, or any other desirable spacing as in Fig. 1 for example, in which spaces are provided between some of the dials to enable the operator to print punctuation characters such as a decimal point and commas between the denominations of the numbers on the work-sheet.

The lower end of the plate 172 has a bent portion 175 which serves as an interponent to move the plate and detent 174 rearwardly to release the computing wheels 169 as will hereinafter appear, and extends forwardly the entire length of the register and under a series of notches 176 in the register casing 157, said notches being of the same letter-space arrangement and number as the dial wheels. Between the notches 176 and the register casing may be placed blocks 178 spaced to correspond with the punctuation spacing of the dial wheels, the number of blocks 178 in each register being one greater in number than the punctuation-spaces between its dial wheels, the extra block being placed adjacent to the left side of the register casing (Fig. 1), and corresponds to the letter-space to the left of the dial wheel of highest denomination of a register when another register is placed adjacent to the left of the former, said registers being so constructed that there need be an interval of only one letter-space between the dial wheel of highest denomination, and the units dial wheel of adjacent registers.

The master wheels 141, 142 do not move in letter-feed direction with the registers and are normally in an ineffective position out of mesh with their computing wheels 169, so that the registers may freely move laterally, thus avoiding any collision between the computing wheels and the master wheels, and permitting the employment of a highly efficient overthrow-preventing Geneva lock of a carry-over mechanism hereinafter to be described. Before any rotation may be imparted to said master wheels by the motor 100 through the computing mechanism, said master wheels must be brought into mesh with their respective computing wheels 169, to rotate their corresponding dial wheels. For the purpose of swinging the master wheels into effective position, there are fast on the right end of the shaft 76, cams 179, 180 which normally lie in a position shown in Figs. 2 and 27. Said cams engage forks 181, 182 respectively, on an arm 183 pivoted at 184 on the right side of the vertical plate 89. Pivoted to the upper fork 181 is a link 185 connected at 186 to an arm 187, fast to a shaft 188 journaled in the plates 88, 89, of the framework. Pivoted at 186 is an upwardly extending link 189, the upper end of which is pivoted to an arm 190 fast on a shaft 191 (Figs. 1 and 2), the right end of which is journaled in the plate 89 and extends across and in front of the typewriter framework, the left end being journaled in a casing 192, which contains the master wheel and tens-carrying mechanism. Rigidly mounted on the left hand of each of the shafts 188, 191 (Figs. 18 and 19), are two upright arms 193, at the upper ends of which are journaled the ends of master wheel shafts 194, 195 on the right ends of which are fixed respectively the master wheels 142, 141, to the left of which there is loosely and co-axially mounted the tens-carrying mechanism hereinafter to be described.

The master-wheel shafts are journaled on the swinging arms 193 and are connected to their respective change gears 139ª, 140ª, which are mounted on the stationary plate 89. The swinging of the arms 193 to bring the master wheels into mesh with the registers, will cause the centers of the master-wheel shafts to move relatively to the stationary centers of the change gears, for which purpose universal joints are provided between the master-wheel shafts and the change gears as will presently appear. The right end of the master-wheel shaft 194 is connected (Fig. 1) to a universal joint 196 which consists of a ball-socket 197 in which is cut a slot 198 adapted to embrace a pin 199 which passes through the center of the spherical left end 200 of the shaft 140, the right end of which is similarly spherically shaped and carries a pin similar to the pin 199 passing through the end 200, and forming part of a universal joint 201, similar in construction to the universal joint 196, the socket 202 of the latter being connected to the gearing on the upper end of the shaft 138 through which rotation from the indexing mechanism to the master wheels is transmitted. The right end of the master-wheel shaft 194 is connected to the universal joint 203 which connects said master-wheel shaft to the left end of the shaft 139 at the right end of which is a universal joint 204, said universal joints being of similar construction as the universal joint 196. The socket of the universal joint 204 is connected to the gearing 139ª midway on the shaft 138 through which rotation is imparted to the master wheel 141.

When any numeral key 40 is depressed to release the shaft 76 so that one revolution may be transmitted thereto by the spring motor, the cams 179, 180 will rotate therewith in counter-clockwise direction as seen in Figs. 2, 19 and 27, thereby causing the arm 183 through the intermediary of the cams 179, 180, to be rocked downwardly during the initial part of said revolution, carrying downwardly with said arm the connected links 185, 189, and arms 187, 190 to cause the rock-shafts 188, 191 to swing in clockwise direction (Fig. 19), and cause the arms 193, fixed thereto, to swing upwardly carrying with them the master wheels 141, 142 and the mechanism connected therewith. This carries said mechanism from the normal Fig. 3 position to the Fig. 19 position at which time the master wheel will be brought into mesh with one of the gears 168 of the register. The cams 179, 180 are so placed on the shaft 76 and so timed with respect to the mechanism of the computing machine that a smooth portion of the segments 75 will be opposite the teeth of the gears 79 during the time that said master wheels move from the Fig. 3 to the Fig. 19 position, at which time said master wheels will come into full mesh with their corresponding gears 168 of the register so that any rotation imparted to said master wheels may be transmitted to the dial wheels.

Owing to the rapidity with which the master wheels are brought into mesh with the register it is desirable to prevent said master wheels and connected mechanism from striking the register too forcibly, which may cause wreckage of the parts and to arrest said master wheels and connected mechanism at the point of proper meshing with the gears 168 of the register, so that the teeth of a gear will not enter too deeply between the teeth of its co-acting gear and cause a malaction. For this purpose there is provided a pin 205 (Fig. 31) on one of the arms 193 adapted to strike against a stop 206 fast on the casing 192 placed so as to allow the teeth of the master wheel and tens-carrying mechanism to enter the teeth of the gears 168 to the proper depth.

When the master wheels are forced into mesh with their respective computing wheels, to position the registers accurately along their line of travel in letter-feed direction, and to prevent any accidental motion of the typewriter carriage 49 and connected column-totalizer carriage 153, when computation is being performed, there is provided on the arms 193 nearest the master wheels 141, 142, (Fig. 34) rearwardly extending projections 207, lying in the same plane as the master wheels and having a beveled edge 208 which is adapted to enter the notches 176 of the register. The comb in which the notches 176 are cut, is beveled at 209 to avoid collision between the extension 207 and the comb 176 at the entrance of the extension thereinto, at which time the beveled edge 208 of the extension engages the bent portion 175 on the plate 172 and forces said plate rearwardly against the tension of its spring 173, to move the detent 174 away from the computing wheels 169 in order that said computing wheels and connected dial wheels may be rotated freely by the master wheel. The master wheel in the manner just described, is swung to engage said computing wheels one at a time, from the wheel of highest denomination to the wheel of lowest denomination, according to the denominational value of the digits of the number being computed. It will be noted that when the master wheel meshes with any computing wheel 169 that all of the other computing wheels are unlocked from the V block detent 174. To prevent said other computing wheels being accidentally rotated, there is provided a V block 210 mounted on one of the arms 193 (Fig. 39) at the right of each master wheel and of sufficient length to extend the entire length of the register. When the master wheel is in mesh with the computing wheel of highest denomination in the register, its V block 210 is adapted to enter between the teeth of the gears 168, thus holding the gears and connected dial wheels rigidly against accidental rotation (Fig. 39). The computing wheels to the left of the master wheel are also held against accidental rotation during the time that the master wheel is in mesh with any of the computing wheels, this being done by the tens-carrying mechanism to be presently described.

The master wheels will be rigidly held in meshing relation with their computing wheels, and will be prevented from being forced out of mesh by any cam action of the gear teeth upon each other, because the cams 179, 180 having concentric portions 211, 212, respectively, are adapted to hold the arm 183 and forks 181, 182, engaging said concentric portions rigidly against motion in either direction during the time of rotation of the shaft 76 in which said forks engage said concentric portions, during which time the master wheels 141, 142 may be rotated to run into the register any digit from one to nine. After the master wheels have ceased rotating, the high portions of the cams 179, 180, engage the forks 181, 182, forcing the arm 183 and connected links upwardly to rock the shafts 188, 191 in counter-clockwise direction, thereby swinging the arms 193 downwardly to bring the master wheels and tens-carrying mechanisms out of engagement with the registers.

If a numeral key is struck when a punctuation space provided on the register is at the computing point, the master wheels will be prevented from assuming a meshing position with the register because the extension 207 will strike a block 178 between the notches of the comb 176, and thereby prevent any further action of the computing mechanism until the master wheel is restored to its normal position by means to be hereinafter described. This malaction of the master-wheel frame will not unlock the wheels of the register since the bent portion 175 of the plate 172 does not extend in front of the blocks 178 and will therefore not be effected by the action of the extension 207, when striking against the block 178.

In order to perform tens-carrying in a computation when the numeral "0" on a dial wheel passes the sight opening in a register, there is provided at the left of each master wheel, a carry-over mechanism which is universal to any number of registers adapted to be operated by the associated master wheel of the carry-over mechanism, which is normally out of mesh with the registers, so that the latter may freely pass by the carry-over mechanism. For this purpose each computing wheel 169 has formed thereon to the left (Figs. 31, 34, 36, 37 and 38) of its gear wheel 168 a carrying tooth 213 adapted to engage and partially rotate a unitary carry-over element 214 which consists of a gear segment 215, a Geneva-lock segment 216 and a gear segment 217 arranged in the order mentioned from right to left, there being as many carry-over elements, less one, at the left of each master wheel as there are letter-space distances in the register, punctuation-mark spaces included. Each carry-over element has three V-shaped notches cut therein, 218, 219, 220 which are adapted to be engaged by a universal detent 221 (Fig. 35) carried on a frame 222 which is pivoted on a rod 223 extending between the arms 193, said detent being normally pressed into the notch 219 by a spring 224 coiled around a rod 223 of the frame 222, thus holding all of the notches and segments of the carrying elements in horizontal alinement. As has been previously mentioned, the master wheels may rotate in either direction to perform addition, or substraction, and when so doing if either of the master wheels rotate any of the dial wheels to the right of the dial of highest denomination in the register from "9" to "0" in addition or in subtraction, the tooth 213 on the computing wheel in mesh with the master wheel will engage the segment 215 of its carrying element 214 to rotate said carrying element one digit distance. The segment 217 of said carrying element being in mesh with the gear 168 of the computing wheel of next higher denomination to the one in engagement with the master wheel will cause the latter computing wheel to rotate one digit distance or one point in the same direction as the computing wheel 169 which is being rotated by the master wheel. This rotation of the computing wheel of higher denomination will be transmitted to its co-acting dial wheel to turn it one point in one or the other direction, thus performing tens-carrying or tens-borrowing, depending whether addition or substraction is being performed. When the tooth 213 of the computing wheel 169 which is in mesh with the master wheel, has completed a one point rotation of its carrying element, no further rotation of the tooth 213 will be transmitted to the carrying element 214, till the master wheel has again assumed its normal position clear of the computing wheels.

The carrying teeth 213 are placed on the left of the adjacent tooth on the gear wheels (Figs. 36, 37, 38 and 39), except that those computing wheels which are to the right of a punctuation space, have carrying teeth 225 (Fig. 39) placed thereon at a distance of one letter-space farther to the left of their gear wheels 168 than on those computing wheels which are not placed at the right of a punctuation space. In a tens-carrying or tens-borrowing action, when the carrying teeth 225 are brought into action, they will engage the segments 215 of their respective carrying elements and also the segments 217 of the carrying elements which are in juxtaposition with the punctuation-mark spaces, across which a carrying action is taking place, the teeth 225 being wide enough for the purpose, and will idly rotate the carrying elements 214 which happen to be opposite a punctuation space during any tens-carrying or tens-borrowing action from a dial wheel of lower to a dial wheel of higher denomination across any punctuation space. This idle action of the carrying element is ineffective, but is necessary in order to allow the carrying teeth 225 to pass the carry-over mechanism and to be made of sufficient width so that they will withstand the strain forced upon them in a carry-over action.

Each carrying element, as stated, is composed of three sections, united to form a unit, and these units are placed adjacent to each other along the shafts 194, 195, at letter-space intervals, which intervals are usually no greater than one-eighth of an inch, and commonly only one-tenth of an inch. By utilizing the construction described above, said teeth 213 are of sufficient strength in the present embodiment, since they are formed in one piece with the gears 168 of the computing wheels, as seen in Fig. 37. The dial wheels are cut away at 166ª (Fig. 31), to allow the carrying teeth 213, 225, to pass, and to enable the computing wheels 169 to rotate.

The dial wheels to the left of the one being driven by the master wheel are held against accidental rotation by the following means: Each computing wheel 169 (Figs. 31, 33 and 38), has formed thereon to the left of its gear 168 a cylindrical portion 226 which contacts with a concave surface 227 on the Geneva segment 216 of the carrying element, when the master wheel is brought into mesh with one of the registers, said surface being of the same radius as the surface 226. On the cylindrical surface of each computing wheel 169 at the left of each carrying tooth 213, 225, and also at the right of each carrying tooth 225, (Figs. 33, 34, 35, 38 and 39) is formed a notch 228 which lies in the same plane as the Geneva-lock segments 216, and is adapted to allow one of the high portions between the concave surfaces of the segment 216 to enter said notch 228 during a tens-carrying or tens-borrowing action so as to enable the carrying elements 214 which are acted upon by any of the carrying teeth 213, 225, to rotate. Thus a concave surface 229 or 230, on either side of the surface 227 may contact with the cylindrical surface 226 of the computing wheel (Figs. 34 and 37). During a computation not involving a carry-over action, or during that part of a computation in which a carry-over action is not taking place, one of the concave surfaces 227, 229, or 230 of the carry-over elements will be in contact with its corresponding cylindrical surfaces 226, which will lock the Geneva segment 216, and the segments 215, 217 fastened thereto against rotation. Said segments 215, 217 being in mesh with their corresponding computing wheels, will hold said computing wheels and their meshing dial wheels against accidental rotation, and since all the computing wheels to the left of the master wheels are in mesh with carrying elements 214 during the time that the detents 174 of the registers are ineffective, all the dial wheels to the left of the one being computed upon will be locked against accidental rotation. The dial wheels to the right of the master wheels are also locked against accidental rotation, since the extension 210 of the arm 193 cannot be forced out of mesh with the computing wheels at the right of the master wheels. Said extension and connected parts will be held rigidly against displacement by the forks of the arm 183 which are rigidly held against displacement by the concentric surfaces of the cams 179, 180, on the shaft 76. After a carrying action has been performed, one of the concave surfaces 229, 230, will come in contact with the cylindrical surface 226 of the computing wheels, not only locking said wheel against further rotation, but also preventing overthrow of the dial wheels at or after the completion of a carry-over action. This overthrow preventing action may be supplemented by the detent 221 snapping into either of the V-notches 218, 220, and preventing further rotation of the carrying elements 214 thus acted upon.

When a carrying action takes place through a large number of dial-wheels, the line of numerals thereon extending across the register and the line of teeth on all connected gear-wheels, may form a spiral, due to lost motion or inaccurate construction of the gears. Should this occur, the notches 219 on the carrying elements will form a similar spiral which will originate at the carrying element nearest the master wheel and extend leftwardly, and will be corrected in the following manner so that the dial wheel numerals will read along a horizontal line at the sight opening. This lagging of the carry-over members is really lost motion between the successive wheels, and causes the high points of said notches 219 to pass the high point of the detent 221 *seriatim* from right to left. When the carrying element 214 nearest the master wheel has ceased rotating in a carrying action, one of the notches 218 or 220 will be in exact alinement with and directly opposite the detent 221, but the corresponding notches of the succeeding carrying elements will be successively farther from exact alinement with the detent 221, although said carrying elements will have been rotated sufficiently so that the high point of their notches will have passed the high point of the detent 221. This detent under the tension of its spring 224 will force its way into the notches of the carrying elements 214 to complete the required rotation of said elements and the connected computing wheels and dial wheels, thus completing any tens-carrying or tens-borrowing action which may have been started by any of the carrying teeth of the computing wheels. Said detent in so doing will not only correct any spiral which may have formed along the line of the carrying elements or connected parts, but also will hold the carrying elements in their abnormal, *i. e.*, carried, position (Fig. 34) until after the teeth of the segments 215, 217, of the carrying element have been withdrawn from mesh with the computing wheels 169, at which time the register detent 174 will be brought into mesh with the computing wheels and lock the dial wheels against further turning.

Since the carrying elements 214, consist of segments having notches formed at their rear, any further rotation of said carrying elements beyond that described above is undesirable. It is therefore necessary after each computation, to restore to normal position any carrying elements which may have been displaced from their normal position by a tens-carrying action. For this purpose there are provided, fast to the master-wheel casing 192, upstanding alining plates 231 extending along the length of the train of tens-carrying elements 214. The surfaces 232, 233, on the tens-carrying elements 214 are adapted to be engaged by the upper ends of the plates 231 on the return of the master wheels and tens-carrying elements to their normal ineffective position (Fig. 32.) When any of the carrying elements have effected a carry-over and are consequently in an abnormal position, due to a tens-carrying action having taken place, their universal detent 221 will lie in one of the notches 218 or 220. It will, however, be displaced from said notches by the alining action which takes place whenever one of the surfaces 232 or 233 strikes either of the plates 231, thus restoring to normal alinement the tens-carrying elements by the power of the spring motor. This alining action is positive since the arms 193 which carry the elements 214 are positively driven to their normal position by the action of the cams 179, 180, fast on the motor-driven shaft 76.

Overthrow of the master wheels 141, 142, at the end of any computation is prevented in the following manner: Fast on the lower end of the shaft 138, (Fig. 2) and above the bevel gear 137, is a crown ratchet wheel 234 having downwardly extending teeth axial on one face and cam on the other, and adapted to be engaged by a pawl 235 formed on the upper fork of an arm 236, also pivoted at 184 to plate 89, the lower fork 237 of which is held upwardly against a cam 238 fast on the shaft 76 by a spring 239. The pawl 235 is normally in engagement with one of the teeth of the ratchet wheel 234 (Fig. 2), but is moved out of engagement with the teeth of the ratchet wheel immediately after the release of the shaft 76 by any numeral key. The teeth on the ratchet wheel are equidistant, and their number is such that when the pawl 235 engages a tooth at the end of a computation, it will arrest the shaft 138 at an angular distance from the beginning of its rotation corresponding to the digital value of the depressed numeral key; the number of teeth in the ratchet wheel corresponding to the gear ratios between the indexing mechanism and the master wheels. During the early part of the rotation of the shaft 76, the cam 238 thereon, forces the arm 236 downwardly to move the pawl 235 out of engagement with the ratchet wheel 234, said pawl remaining in its downward position until the shaft 76, which also carries the segments 75, has nearly reached the end of its rotation. When the last tooth of the effective segment is in engagement with one of the gear wheels 79 on the shaft 80, at which time the shafts 80 and 138 are just a trifle less than one point near the end of their rotation, an abrupt drop 240 on the cam 238, will reach the fork 237 of the arm 236 to allow the spring 239 to raise said arm and bring the pawl 235 thereon into engagement with the ratchet wheel 234, and into effective position at almost a whole digits rotation before the end of the rotation of the shaft 138 and its associated master wheels 141, 142. The teeth of the ratchet wheel 234 are formed with the faces described above, so as to cause a positive locking when they strike the pawl 235 in the direction of rotation of the shaft 138, and are so formed as to allow free rotation of the shaft 138 after the pawl 235 has been returned to effective position, until said shaft is positively stopped by the pawl and locked against further rotation.

It will be seen that the master wheels are free from the influence of the pawl 235 during the greater part of the rotation of shaft 76. It is therefore desirable to guard the master wheels against accidental rotation during the idle rotation of the segments 75 on the shaft 76. For this purpose there are provided on the interponents 74, cylindrical surfaces 241 which slide into mesh with Geneva-lock wheels 242 fast on the shaft 80 and adjacent at the right of the gear wheels 79, (Figs. 7 and 11), thus locking said gear wheels and associated parts against rotation until a cut-away portion 243 on the cylindrical surfaces 241 is brought opposite the concave point of the Geneva-lock wheel 242, (Figs. 7 and 10), thus breaking the lock between said wheel and interponent to permit the gear wheel 79 and associated parts to rotate. These cut-away portions 243 are formed adjacent to, and at the right of the teeth of the segments 75, and are of varying extents along the surface 241, corresponding to the digital value of their respective numeral keys. The extent of each cut-away portion 243 is such that it will allow the free rotation of the gear wheels 79 from the time the first tooth of any of the segment engages the gear wheels, until the last tooth of any of the segments 75 has moved out of mesh with its co-acting gear 79. Then the cylindrical surface 241 will contact with one of the concave points of the Geneva-lock wheel 242 and will remain in this locking position until the pawl 235 has been restored to its effective position to stop the rotation of the shaft 138, after which the interponent 74 is moved to its normal position along the shaft 76 by the cam 73 formed on the plate 71 of the cam frame acting on the right hub 244 of the interponent 74.

On the register carriage 153, as hereinbefore described, is mounted a plurality of totalizers 245, each adapted to compute numbers arranged in a single vertical column on the work-sheet, the registers being placed in the same proximity to each other along the carriage 153 and in the same relative position to the printing point as said columns or computing zones, there being provided for this purpose a letter-space scale 153ᵃ along the register carriage 153, corresponding to the usual letter-space scale 153ᵇ on the framework of the typewriter. Mounted on the right of the typewriting machine, between vertical plates 88 and 89, is a cross totalizer 246, similar in construction to the totalizers 245, adapted to show at its sight opening 177, the totals of the numbers as they are written across the work-sheet, said computation taking place simultaneously with the computation performed on the column totalizers 245. To effect this simultaneous computation, it is necessary that each of the column totalizers 245 and the cross totalizer 246, move simultaneously, step by step, in letter-feed direction, and in such relative position to each other that the computing wheels of identical denominations thereon will be brought into meshing relation with their respective master wheels 142, 141. For this purpose there is provided at the rear of the casing of each of the column totalizers 245, a projection 247 (see Figs. 1, 32 and 33), adapted to engage a pawl 248 pivotally and adjustably mounted on a rod 249 fast to a cross totalizer carriage 250, slidingly mounted on horizontal bars 251 extending between and fast to the plates 88 and 89, said carriage 250 being adapted to move leftwardly and rightwardly along the rods 251 (Fig. 1). The cross totalizer 246 normally stands so that the computing wheel of highest denomination is one letter-space to the right of the master wheel 141, and its left-hand dial wheel 166 is one letter-space to the right of an index point 252 on the master wheel casing 253. The master wheel casing 192 of the column totalizers is provided with an index pointer 254, which is in a position corresponding to the index pointer 252 and bears the same positional relation to its master wheel as the latter. As the column totalizer carriage is moved from left to right, the projection 247 will pick up the pawl 248 when the dial wheel of highest denomination of the register 245 is one letter-space to the right of the index pointer 254. Any further motion of the column totalizer carriage in letter-feeding direction will carry with it the pawl 248 and cross totalizer 246 (Fig. 1), so that any number run into the column totalizer 245 will also be run into the cross totalizer 246.

When the units dial wheel of the column register 245 has reached the index pointer 254, the cam edge 255 (Fig. 1ᵃ) on the forward end of the pawl 248 will strike a camming roller 256 mounted on the framework of the typewriter, so that a one-step movement of the pawl 248 in letter-feeding direction after the units dial wheel has passed the index pointer 254 will cause the forward end of said pawl to move downwardly out of engagement with the projection 247 on the column totalizer to allow a spring 257 on the cross totalizer carriage to draw it and its connected parts rightwardly until a collar 258 fast to and adjustably mounted on the rod 249 strikes the framework of the master wheel casing 192 and arrests the cross totalizer carriage 250 in its rightward normal position against the tension of its spring 257, in which position the pawl 248 will stand ready to be engaged by any projection 247 in any succeeding computation. The pawl 248 is pivoted to a block 259 adapted to slide along the length of and be fastened to the rod 249, thus providing an adjustment along said rod, so that the cross totalizer may be adjusted rightwardly or leftwardly in relation to the column totalizers 245 and the typewriter carriage 49 to cause a perfect meshing of the master wheel 142 and tens-carrying mechanism adjacent thereto, with the cross totalizer. Said pawl 248 is pressed upwardly by a spring 260, (Figs.

1 and 1ª) and has a tail 261 formed at the rear end thereof, which contacts with the rod 249 to limit the upward throw of the forward end of the pawl 248 against the pressure of the spring 260. The cross totalizer 246 may be fast on its carriage 250, but in the present embodiment of the invention is attached and locked to its carriage in a manner similar to the column totalizers 245. The carriage 153 may be provided with one or more lugs 262 adjusted and locked thereto in a similar manner as the registers, (Figs. 1 and 1ª) and adapted to engage the pawl 248 to cause the cross totalizer to move in letter-feeding direction with the typewriter carriage 49, so that computation may be performed on the cross totalizer while no computation is performed on any of the column totalizers, as for example, when it is desired to run a number only into the totalizer 246 at the beginning of a computation, or to return said totalizers to zero, simultaneously with the writing of the cross total on the work-sheet at the end of a computation.

The column totalizers 245 may each perform addition or subtraction at the will of the operator, there being provided a manually-operated mechanism whereby the direction of rotation of the master wheel 142 may be determined. It will be noted that the shaft 138 as well as the shafts 76 and 80 always rotates in the same direction. To change the direction of rotation transmitted by the shaft 138 to the shaft 140, with which the master wheel rotates, there is provided a change gear 140ª, at the upper end of the shaft 138, which consists of a lower beveled gear 263, and an upper beveled gear 264, both of which are loosely mounted on the shaft 138, so that they may freely rotate thereon, but are prevented from sliding thereon by collars fast on the shaft. Each of said gears (Fig. 22) has fastened therein a clutch member 265, the teeth of which are beveled and are adapted to engage a sliding clutch member 266, having oppositely-disposed beveled teeth and adapted to engage the teeth of either of the clutch members 265, so as to impart rotation to either of the gears 263 or 264, with which the clutch member 266 may be in mesh, this resulting from the fact that one of said gears rotates in the same direction as the shaft 138. Such rotation is brought about by the sliding clutch member 266, which although slidingly mounted on the shaft 138, is compelled to rotate therewith by a key 267 fast on the shaft 138.

Rotatably mounted on the vertical plate 89 is a beveled gear 268 constantly in mesh with the gears 263, 264, and fast to the socket 202 of the universal joint 201, on the right end of the shaft 140. When the gear 264 is connected by the sliding clutch member 266 to the shaft 138 to rotate therewith, the beveled gear 268 and associated parts will rotate therewith to turn the master wheel in adding direction, while the beveled gear 263, in mesh with the beveled gear 268, will be rotated idly in the opposite direction to the direction of rotation of the shaft 138. When the sliding clutch member 266 is connected to the gear wheel 263 to rotate with the shaft 138, it will transmit rotation to the beveled gear 268 in the opposite direction to turn the master wheel in subtraction direction, the beveled gear 264 being turned idly in the opposite direction to the rotation of the shaft 138. To slide the clutch member 266 along the shaft 138 into mesh with either of the beveled gears 263 or 264, the sliding clutch member is provided with an annular groove 269, into which extends a pin 270 (Figs. 22 and 27), pivoted on an arm 271, which is pivoted at 272 to the plate 89 and has connected thereto, at its forward end, a downwardly extending link 273, the lower end of which carries a pin 274, which normally lies at the rear end of a slot 275, in an arm 276, which is pivoted at 277 to a bracket 278, fast at the right of the plate 89 (Fig. 2). When it is desired to perform addition on one or all of the registers 245, the front end of the arm 276 is moved downwardly, there being provided a finger-piece 279 for that purpose, causing the rear end of said arm, which is at the other side of its pivot 277, to move upwardly and carry therewith the link 273, arm 271 and pin 270, thereby causing the sliding member 266 of the clutch to connect the upper beveled gear 264 with the shaft 138, to cause the master wheel 142 to turn in adding direction (Fig. 2). If it is desired to perform subtraction on any of the registers 245, the finger-piece 279 is moved upwardly from the Fig. 2 to the Fig. 29 position, moving all the associated parts in the opposite direction to that in which they move when the finger-piece 279 is moved downwardly to adding position. The sliding member 266 will engage the lower beveled gear 263 to connect it to shaft 138, so that it may rotate therewith to cause the master wheel 142 to turn in subtraction direction. To hold the arm 279 and its connected parts against accidental displacement in adding or subtracting position, there is provided (Figs. 27, 28, 29 and 30) a pawl 280, pivoted to the bracket 278 and pressed forwardly by a spring 281, so that the upper end of said pawl will engage a pin 282, fast on the arm 276 to hold said arm in adding or subtracting position. The upper end of said pawl 280 is cam-shaped, so that, by the power of its spring 281, it tends to complete the stroke of the arm 276, in case the operator should not fully depress or raise said arm when setting it to an adding or subtracting position.

In case it is desired to reverse the direction of rotation of the master wheel without changing the setting of the arm, as for the purpose of correcting an error in a computation, there is provided a frame 283, having a forwardly extending finger-piece 284 thereon and having a slot 285, which engages the pin 274, the frame 283 being provided with a spring 286 which holds it in its normal position, as shown in Fig. 2, thereby holding the pin 274 in the rear end of the slot 275 in the control lever 276. The slot 275 extends on either side of the pivot 277, so that the forward and rearward ends thereof will move in opposite directions around said pivot when the control lever 276 is operated, with the result that said slot will be inclined downwardly from the pin 274 when the control lever 276 is in adding position, and will extend upwardly when the control lever is in subtracting position. At the depression of the finger-piece 284, the pin 274 will be moved lengthwise of the slot 275 to its forward end, regardless of the position of the control lever 276, and will move said pin downwardly when the control lever is in adding position (Fig. 30), or will move said pin upwardly when the control lever is in subtracting position, according to the position of said control lever, the link 272 and connected parts. Since the detent 280 holds the finger-piece 279, no matter how the finger-piece 284 is operated, the result is that the sliding member 266 will be moved out of mesh with either of the beveled gears 263, 264, into mesh with the other, thus causing the master wheel 142 to rotate in the opposite direction from that indicated by the position of the control lever 276. On the release of the finger-piece 284, the frame 283 will be restored, by its spring 286, to normal position and carry therewith the pin 274 to the rear end of the slot 275, thus restoring the state determined by the position of the control lever 276.

When a numeral key has been erroneously depressed in a computation, the error may be corrected in the following manner: The dial wheel which has been erroneously operated is brought back so that its computing wheel will stand in meshing relation with the master wheel at which point the typewriter carriage 49 and column totalizer carriage may be held until the operation of error correction is completed. The finger-piece or error key 284 is then depressed after which the numeral key which had been erroneously operated is again depressed to rotate the dial wheel a corresponding digit distance, but in an opposite direction to that in which the dial wheel had been erroneously rotated, thus returning the dial wheel to the position it occupied before the error had been made, after which the finger-piece 284 is released and the desired numeral key is operated.

The cross totalizer 246 may either add or subtract at any point in a computing zone. It, however, will not be set to either addition or subtraction, until one of the numeral keys, "1" to "9", has been depressed, at which time the computing mechanism for the cross totalizer is set to addition or subtraction, as required. In order to enable a numeral key 40 to set the cross totalizer computing mechanism into a predetermined state, depending whether it is desired to perform addition or subtraction in any computing zone along the writing line on the work-sheet, there is provided at the rear of the typewriter carriage 49 a controlling connection which includes two rearwardly extending brackets 287, (Fig. 16) attached to the brackets which support the rack bar 62 of the usual Underwood decimal tabulating mechanism, said brackets 287 supporting a bar 288, having a slot 289, extending the entire length thereof, along which is adjustably mounted, at letter-space intervals, cam plates 290 held in place by thumb nuts 291 on screws 292, passing through the slot 289, said screws having their free ends bent over the upper edge of the bar, as at 293, to prevent rotation of said screws when the cam plates 290 are loosened and adjusted along the bar 288. Pivoted at the rear of the typewriter framework is a bell-crank 294, (Figs. 2, 3 and 16) the horizontal arm of which carries a tappet roller 295, which stands in the path of the cam plates 290 and will be depressed when any of the cam plates 290 is brought to the writing point of the typewriter, the position of said cam plates along the bar 288 being determined by the position of the computing zone along the carriage 49, or vice versa. The bar 288 has letter-space graduations marked thereon for the purpose of locating the cams, said graduations corresponding to the graduations on the column totalizer carriage scale 153$^a$ and the usual typewriter front scale 153$^b$ and decimal tabulator stop scale 61$^a$. The stops 61 of the decimal tabulator are usually placed on their rack bar at points corresponding to the position of the cam plates 290 along the bar 288. This bell-crank 294 acts as a selecting device to enable the typewriter keys to determine addition and subtraction. For this purpose there is connected to the depending arm of the bell-crank 294 a rightwardly extending link 296, the right end of which is connected to the rear end of a horizontally disposed lever 297 of the first order (Figs. 2, 3 and 16), the forward end of which carries a link 298, extending rightwardly and connected to the rear end of an interponent 299 (Figs. 2 and 16). The forward end of this interponent is pivoted to an arm 300, fast on the power operated shaft 188, the rear end of said interponent being adapted to move horizontally but normally held in its leftward position through the link 298 and the lever 297 by a spring 301, which, through said lever and the link 296, holds the roller 295 on the bell-crank 294 in the path of the cam plates 290. The link 298 passes freely through a slot 302 cut in the vertical plate 89 and has two collars 303 fast thereon, one on either side of the plate 89, said collars forming stops which strike against the sides of the plate 89, to limit the rightward and leftward motion of the interponent 299 (Figs. 1, 2 and 16).

When the typewriter carriage 49 is moved in letter-feeding direction to bring a computing zone on the work-sheet in which it is desired to perform addition, to the writing point, the corresponding cam plate 290 will depress the roller 295 against the tension of the spring 301, swinging the interponent 299 rightwardly into the path of the upper end of a vertical lever 304 pivoted at 305 on a stud fast to the right side of the vertical plate 89. On the depression of a numeral key the shaft 188 will be rocked in a clockwise direction to cause the master wheel 141 and tens-carrying mechanism to the left thereof to come into mesh with the register of the cross-totalizer. The rocking of the shaft 188 will at the same time by its arm 300 thrust the interponent 299 rearwardly against the upper end of the addition lever 304 (Fig. 25) causing the machine to add. To do this the lower end of the lever 304 has a cam 306 formed thereon adapted to engage a pin 307 fast on an arm 308 pivoted at 309 on a bracket 310 fast between the bracket 278 and plate 89, said pivot being concentric with the pivot 277 of the arm 276; said arm 308 lies in a plane parallel to that of the arm 276, and has a slot 311 cut therein similar to and of the same extent as the slot 275 in the arm 276, and placed in the same relation to its pivot 309 as the slot 275 is to its pivot 277. A pin 312, which normally lies at the rear end of the slot 311, is fast to an upwardly-extending link 313, the upper end of which is pivoted to an arm 314 similarly mounted and formed as the arm 271, and has a pin 315 pivoted to the forward end thereof to engage a sliding clutch member of a change gear 139ª placed midway of the shaft 138, said change gear being of the same construction, and similarly operated, as the change gear 140ª and its clutch, at the upper end of said shaft. At the rearward thrust of the interponent 299 the lower end of the addition lever 304 is swung forwardly so that its cam 306 engages the pin 307 on the arm 308, causing the rear end of said arm to swing upwardly around its pivot 309 and carry therewith the link 313 and pin 315, to clutch the upper bevel gear of the change gear 139ª to the shaft 138, so that rotation will be transmitted to the shafts 139, 195 and their connected master wheel 141, in adding direction to cause the cross-totalizer 246 to perform addition. Since the cam plate 290 is of the width of the totalizer adding will take place throughout the entire width of the computing zone, the extent of which is the same number of letter-spaces as there are in the totalizer.

When it is desired that the cross-totalizer 246 shall perform subtraction in any computing zone, the cam plate 290 is omitted at the corresponding place on the bar 288, (Fig. 2) so that the roller 295 will not be depressed, thus leaving the interponent 299 in its normal leftward position at the time the typewriter carriage 49 is in said zone, during which time the upper end of a downwardly-extending subtraction lever 316 (Fig. 16) will lie in the path of the interponent 299, said lever 316 also pivoted at 305, and having a cam 317 formed thereon adapted to engage the pin 307 when the lower end of said lever is swung forwardly under similar conditions, as when the lever 304 is operated, at which time the cam 317 (Fig. 23) will engage the pin 307 to swing the rear end of the arm 308 downwardly around its pivot 309, and carry with it the link 313 and pin 315, so that the lower bevel gear of the change gear 139ª will rotate with the shaft 138, to cause the shafts 139, 195, and connected master wheel to perform subtraction. To limit the motion of the arm 308, there is provided a pin 318 (Figs. 16, 23 and 25) fast to the forward end thereof, adapted to strike stops 319 formed on the bracket 310.

For the purpose of permitting a change in the state of the cross-totalizer 246 without disturbing the position of the cam plates along the bar 288 (Fig. 24), there is provided a slot 320 cut in the frame 283, similar to and parallel with the slot 285, the former engaging the pin 312 so as to move said pin to the forward end of the slot 311 at the depression of the finger-piece 284, so that the link 313 will move upwardly or downwardly with the front end of the arm 308 (Figs. 24 and 26) instead of with the rear end thereof, when said arm is actuated by the adding or subtracting lever 304 or 316 respectively. This movement of the link is in opposite direction to that which would have been imparted to it at the depression of a numeral key when the pin 312 is at the rear end of the slot, thus causing the sliding clutch member of the change gear 139ª to so connect the change gear as to rotate the master wheel 141 in an opposite direction to that predetermined by the positioning of the cam plates along the bar 288. By depression of the finger-piece 284, the action of the master wheel on the cross-totalizer may be reversed in the same manner as in a column-totalizer, as hereinbefore described, and simultaneously with an error correction on the latter. Upon the release of the finger-piece 284, the pin 312 will be restored to its normal position at the rear end of the slot 311 by the power of the spring 286, and computation may continue on the cross-totalizer 246, in accordance with the setting of the cams on the bar 288.

It will be noted that the slots 285, 320, engaging the pins 274, 312, of the links 273, 313, respectively, are both formed on the frame 283 and are moved forwardly simultaneously on the depression of the finger-piece 284, thus changing simultaneously the direction of rotation of the master wheels 142, 141, of the column and cross-totalizers respectively, from the originally intended direction of rotation of said master wheels, regardless of whether said master wheels were intended to rotate in the same or in opposite directions to each other (Figs. 2 and 27). Thus an error in the computation may be corrected in any of the column-totalizers and the cross-totalizers simultaneously at the depression of the error key 284.

The master wheels 141, 142, are held against accidental rotation by detents 322 effective on star wheels 321 (Figs. 2 and 20) fast to the hubs of the bevel gears 268 adjacent the right side of the vertical plate 89, said detents being pivoted pawls 322 which normally engage the teeth of the star wheels to hold the shafts 139, 140, and their respective master wheels, against rotation (Fig. 2). The pawl detents are held in their effective position by a universal link 323 which is pivoted to each of the detents 322 at its free ends, and is controlled by the shaft 76. For this purpose, said link has its lower end pivoted to the fork 324 of an arm 325 which is also pivoted at 184, and has a fork 326 in engagement with a cam 327 fast on the shaft 76 adjacent to the right side of the plate 89, the cam being also engaged by the forward end of the fork 324 which normally rests on the high cylindrical portion of said cam, the fork 326 normally resting on the low cylindrical portion of the cam. When the shaft 76 rotates in counter-clockwise direction in a computation (Figs. 20 and 21), the cam 327 rotates therewith to bring the low cylindrical portion of said cam under the end of the fork 324, and to bring its high cylindrical portion into engagement with the fork 326, thereby swinging the arm 325 downwardly (Fig. 20) which carries the link 323 and pawls 322 downwardly and out of mesh with the star wheels 321, allowing the star wheels and their respective master wheels to be rotated. The arm 325, during said rotation, is rigidly held in its downward position by the cam 327, which, near the completion of its rotation, causes the forks 324 and 326 of the arm 325 to ride up on the high and low cylindrical portions respectively of the cam 327 (Fig. 21), thus restoring the pawl detents to their normal effective position, preventing any further rotation of the master wheels.

The cam 327 is mounted on the shaft 76, in such relative position to the cam 180 on said shaft, that the action of the cam 327 in relation to the action of the cam 180, is such that the pawl detents 322 will remain in effective position during the time that the cam 180 and associated parts are moving the sliding clutch member 266 of the change gear 139$^a$ from one of the clutch members 265 to the other, after which the cam 327 acts to depress the arm 325 to release the master wheels, so that rotation may be imparted thereto. The pawl detents 322, therefore, being normally in effective position, will hold the column-totalizer master wheel 142 against accidental rotation during the time the sliding clutch member 266 of the change gear 140$^a$ at the upper end of the shaft 138 is being manually operated, or during the time said sliding clutch member is operated by the depression of the reversing key 284.

The fork 326 has an extension 328 thereon (Figs. 1, 2, 20 and 21) adapted to engage the notches of a detent wheel 329 on the right end of the shaft 80, and to the left of the bevel gear 136, said extension 328 engaging or releasing the detent wheel 329 at the same time that the pawls 322 engage or disengage the detent star wheels 321, since said extension is operated by the cam 327. The object of holding the shaft 80 against accidental rotation by a detent formed thereon, is to hold the concave portions of the Geneva lock wheels 242 on the shaft 80 in a concentric position with the cylindrical portions 241 of the interponents 74 on the shaft 76 when said interponents are in ineffective position (Figs. 7 and 9), so that said cylindrical portions may freely slide into engagement with said Geneva lock wheels at the depression of a numeral key 40.

In order that numerals may be printed in any predetermined zone along the writing line in which it is not desired to register the numbers on the totalizers, the computing mechanism is advantageously normally neutral, viz., neither adding nor subtracting. It may, however, be automatically made effective when any zone is at the writing point. For this purpose, there is pivoted at the rear of the framework of the typewriter, directly in front of the bell-crank 294 (Figs. 2, 3, 4, 7, 15 and 16) a bell-crank 330 carrying at the end of one arm a roller 331 having attached to the other arm a downwardly-extending link 332, the lower end of which is connected to an arm 333 fast on a rock shaft 334 extending from the rear toward the front of the machine, and carries at its forward end an arm 335 to which is fast a flexible extension 336 the end of which overlies and may depress the rear end of the universal trip arm 133, to cause the teeth 134 thereon to stand in engaging relation with the tooth 135 of the retaining pawl 84 which holds the shaft 76 against rotation (Figs. 7 and 13). The spring 149 not only draws the universal trip bar 133 rearwardly, but normally tends to draw its rear end upwardly (Fig. 4), so that the teeth 123 at its forward end will be out of engaging position with the tooth 135 on the retaining pawl 84, in which position the pawl will no longer be effective to release the spring motor and shaft 76. Although the type will print on the work-sheet, the digit represented by the numeral key will not be run into the registers of the machine because the associated interponent 74 of said numeral key slides idly along the shaft 76. It will be seen from the foregoing that although the cross-totalizer may perform addition or subtraction, regardless of the state of the coacting column-totalizer, a neutral setting, along the cam-carrying bar 288 at the rear of the typewriter carriage, will be common to the column and cross-totalizers 245, 246, regardless of the manual state setting of the column-totalizer, which cannot be computed upon without a simultaneous computation taking place in the cross-totalizer.

The above-described bell-crank 330 is made effective to connect the computing mechanism to the typewriting mechanism by means of a cam plate 337 (Figs. 7, 15 and 16) similar in construction to the cam plates 290, but in front thereof, and adapted to coöperate with the roller 331 on said bell-crank 330. There may be a series of these cam plates 337 similar in construction to the cam plates 290 and like them adjustable along the bar 288 at letter-space intervals and firmly held in position by the rear ends 293 of the screws 292 and thumb-nuts 291. The effective surface of said cam plates is of the same letter-space length as the letter-space length of any of the registers, and the plates are adapted to engage and depress the roller 331 to make the computing mechanism effective. To do this, they raise the link 332 to rock the shaft 334 to depress the forward end of the flexible extension 336 which overlies the universal bar 133, thereby depressing the rear end of said bar until the teeth 134 thereon are in engaging relation with the pawl 84, with the result that said pawl will be tripped at the depression of any numeral key. The roller 331 is held in the path of the cam plate 337 (Fig. 4) by the spring 149 pressing upwardly on the forward end of the arm 335, which, through its connected parts, raises the roller 331 until a stop arm 338 fast on the shaft 334 strikes the framework of the typewriter to limit the motion of said rock shaft and the roller 331 connected thereto. The object of the stop 338 is to prevent the roller 331 from rising so high that the vertical edge of the cam plates 337 will abut against the roller 331 and prevent the letter-feed motion of the typewriter carriage 49.

Whenever any one of the above-described cam plates 337 is effective to connect the computing mechanism to the typewriter keys, it will cause subtraction in the cross totalizer. While the cam plates 290 have been described above as causing the numeral keys to be effective on the interponent 299 to cause addition in the cross totalizer, they are not sufficient to attain this result alone, because they do not of themselves connect the typewriter numeral keys to the computing mechanism. In order to provide for such connection of the keys to the computing mechanism, there is associated with each plate 290 one of the cam plates 337, said cam plates being effective, as described above, to cause the keys to operate the computing mechanism by making the keys effective on the pawl 134. Therefore, when subtraction is to be performed, a cam plate 337 is placed along the bar 288 in a letter-space position to correspond to the position of the computing zone in which it is desired to perform subtraction on the cross-totalizer, the cam plate 290 being omitted from said position in the rear of the cam plate 337 (Figs. 7 and 16). The location of the cam plates along the bar 288 may be determined in the same manner as the location of the cam plates 290, using the graduations along said bar.

The computing mechanism may be manually neutralized at any point along the writing line at the will of the operator, regardless of the position occupied by the cam plates 290, 337, along the bar 288, or the position of the control lever 279. For this purpose, there is pivoted to the front of the framework of the typewriter a bell-crank 339 (Figs. 4, 5, 6, 7 and 12), the upright arm of which has a handle fast thereon and carries at its upper end extensions 340 which abut against a stop pin 341 to limit the rightward or leftward motion of said arm, the arm being firmly held in position by a compression spring 342 (Figs. 4 and 7), which causes it to bear frictionally against the surface of the typewriter framework. The horizontal arm of the bell-crank 339 has a downwardly-extending link 343 attached thereto, the lower end of which is slidingly mounted in a guide 344; and when depressed will strike a shelf 345 formed on the forward end of the trip bar 133 (Figs. 5, 6 and 7). When the upright arm of the bell-crank is in its leftward position, as seen in Fig. 7, the lower end of the link 343 will stand clear of the shelf 345. When the upright arm of the bell-crank 339 is moved rightwardly from the Fig. 7 to the Fig. 6 position, to depress the link 343, the lower end thereof will engage the shelf 345 and depress therewith the forward end of the trip bar 133 against the tension of the spring arm 336 to move the teeth 134 out of engaging relation with the trip pawl 84. The depression of any numeral key will then be ineffective on the computing mechanism during a printing action. The computing mechanism, however, will be again effective if the upright arm of the bell-crank 339 is returned to its leftward ineffective position, provided one of the cams 327 is in effective position at the moment.

Since upper-case character-type 45 on the type-bars 44 are adapted to print at the depression of a numeral key 40, it is desirable to disconnect the computing mechanism so that the down stroke of the numeral key will be ineffective thereon when the platen frame 48 of the typewriter carriage is shifted to an upper-case position, at which time the upper-case character-type 45 connected to the numeral keys will print on the platen 47. For this purpose, there is loosely connected at 346, to the shift frame 65 (Figs. 4 and 5), the rear end of a lever 347 pivoted midway its ends to the framework of the typewriter. The forward end of said lever has connected thereto a link 348, the lower end of which is guided at 349 (Fig. 5) to normally stand above the shelf 345 on the universal trip bar 133 when said trip bar is in engaging relation with the retaining pawl 84. On the depression of the shift-key 63, the forward end of the shift-arm 65 is swung upwardly, rocking the lever 347 to depress the link 348 (Fig. 5), so that the lower end thereof strikes the shelf 345 and carries the forward end of the trip bar 133 clear of the trip pawl 84, so that the depression of a numeral key in said upper-case position will be ineffective on the computing mechanism. At the release of the shift-key, the associated parts are restored to their normal position so that computation may be resumed.

When the electric motor 90 is winding the spring motor 100 and operating the automatic electric switch mechanism, it is desirable to lock the numeral keys against depression in order to prevent wreckage of the switch terminals due to possible electrical arcing. For this purpose, the machine is provided with the usual Underwood line-locking mechanism which is adapted to perform its normal function of locking the keys against depression when the typewriter carriage 49 has reached the limit of its forward motion, as well as locking the keys during the rotation of the electric motor. At the left end of the slide 127 (Figs. 1 and 16) is pivoted one arm of a bell-crank 350, pivoted to a bracket on the plate 88; the other arm of said bell-crank having pivoted thereto a link 351, the lower end of which has a pin-and-slot connection 352 with an arm 353, the hub of which is connected with an arm 354 of the line-locking mechanism (Figs. 1 and 17), the upper end of said arm 354 carrying a universal locking bar or bail 355 adapted to pass under hooks 356 on the key levers 42. When the spring motor 100 has rotated sufficiently so that the sleeve 111 has slid a sufficient distance leftwardly along the shaft 96 to close the switch 109, the lever 116 will move the slide 127 rightwardly to swing the bell-crank 350 and draw the link 351 and arm 353 upwardly, which, through a spring 357 (Fig. 17) rocks the arm 354 and bail 355 forwardly and under the hooks 356 of the numeral keys, thus preventing the depression of any numeral key during the time that the upper end of the lever 116 remains in its rightward position to keep the switch 109 closed. In order to hold the bail 355 in effective position during the entire time that the motor 90 is rotating, it is necessary to swing the bail 355 into effective position at the beginning of said rotation, but since the arm 353 swings during the entire rotation of the motor 90, said arm is adapted to swing a greater angular distance than that required by the arm 354, to bring the bail 355 into effective position. For this purpose, the hub of the arm 353 is provided with a tongue 358 placed forwardly of a tongue 359 on the hub of the arm 354; said tongues being pressed against each other by the coil spring 357, which construction permits the arm 353 to move upwardly after the universal bail 355 has reached the limit of its forward motion. The idle motion of the arm 353, after the bail 355 has reached the limit of its forward motion, serves to tension the spring 357, and is adapted to hold the bail 355 in effective position during the time that the point of the lever 116 passes over the cam surfaces 122 of the pawl 121, to close the switch 109; the tongue 358, during said idle motion of the arm 353 becomes disengaged from the tongue 359 of the arm 354, leaving a space between the tongues 358 and 359. When the upper end of the lever 116 is swung leftwardly to open the electric switch 109, the slide 127 and connected parts will be moved in the opposite direction to cause the tongues 358, 359, to reëngage, up to which time the bail 355 remains in effective position, and after which time the arms 353 and 354 will move simultaneously and return to normal position the universal locking bail 355 to release the numeral keys 40.

One reason for providing this connection, is that the rotation of the electric motor 90 tends to move the sleeve 111 rightwardly along the shaft 96, whereas the rotation of the spring motor 100 tends to move said sleeve leftwardly along the shaft. If, during the rotation of the motor 90, at which time said sleeve is moving rightwardly, a numeral key could be depressed, which would cause a rotation of the spring motor 100 and a leftward movement of the sleeve, said sleeve would remain stationary, owing to the fact that the electric motor 90 and the spring motor 100 each tend to simultaneously move said sleeve in opposite directions. If this should occur at the moment that electrical contact of the switch 109 is broken, an electric arc might be maintained between its terminals 119, 120. The above construction prevents such arcing.

The connection from the universal locking bar 355 to the switch-operating mechanism does not interfere with the usual operation of the line-locking mechanism at the end of the forward travel of the typewriter carriage, because the pin on the arm 353 will move idly in its slot during the normal operation of the line-locking mechanism.

If, during the computation of a digit, the machine should lock or fail to act properly before the completion thereof, the parts may be returned to their normal position by manually rotating the power-driven shaft 76 in a direction opposite to that in which it is driven by the spring motor 100. For this purpose, there is mounted at the extreme right end of the shaft 76 a hand-wheel 360 which normally rotates idly with the shaft 76, and which may be manually rotated in a clockwise direction against the tension of the spring motor 100, said rotation causing the segments 75 to rotate the shaft 80 and associated parts and master wheels in an opposite direction to their normal direction of rotation, thus returning the dial wheels in mesh with said master wheels to the position which they occupied before the computation began. During this return rotation of the shaft 76, the extension 83 thereon may pass under and beyond the retaining pawl 84, so that the upper end of said pawl will snap into the path of the extension 83, to arrest the counter-clockwise rotation of the shaft 76 on release of the hand-wheel 360. After the dial wheels have been returned and the hand-wheel 360 released, the typewriter carriage 49 and register carriages 153, 250, will move one letter-space in letter-feeding direction. Said carriages may be manually returned to the printing and computing points and the last numeral key operated may be again depressed. The clockwise rotation of the hand-wheel 360 will cause the pinion 101 and its meshing gear wheel 99 fast to the casing of the spring motor 100 to rotate said motor in an opposite direction of rotation to that of its normal direction of rotation, to restore therein the power transmitted to the computing mechanism from the beginning of the computation to the time the mechanism became stalled. The hand-wheel 360 may also be rotated against the spring motor to restore the parts to their normal position in case a numeral key has been depressed when a punctuation space on the registers is at the computing point and the machine has been locked by the comb 176.

It will be seen that the computing mechanism is directly driven by the spring motor 100, which insures a uniform speed of the parts driven thereby and is free from any of the disadvantages due to any change in the electric current supplied to the electric motor 90, thus enabling the computing machine to be operated with the same efficiency regardless of the source of power which drives the electric motor, which may be a storage battery, the electric current supplied by which decreases gradually as it becomes exhausted, the speed of the electric motor decreasing accordingly. The driving mechanism of the computing machine also has the advantage that, if after the electric motor has stored sufficient power in the spring motor, the supply of electric current should cease, computation may be continued, the spring motor 100 being of sufficient capacity to complete an ordinary computation.

Variations may be resorted to within the scope of the invention, and portions of the improvements may be used without others.

Having thus described my invention, I claim:

1. In a combined typewriting and computing machine, the combination with a bank of typewriter numeral keys and computing wheels, of a shaft for turning them and normally at rest but tending to turn, an interponent for each numeral key, splined on said shaft to always turn therewith and normally in an ineffective position, but each moved to effective position by its key, a universal bar operated by said numeral keys and effective to release said shaft to cause it to be turned, teeth on each interponent proportional to the numeral key controlling it, a totalizer including said wheels, and a master wheel driven by said interponents by said shaft.

2. In a combined typewriting and computing machine, the combination with a bank of typewriter numeral keys and computing wheels, of a shaft for turning them, and normally at rest but tending to turn, an interponent for each numeral key, splined on said shaft to always turn therewith and normally in an ineffective position, a universal bar operated by said numeral keys and effective to release said shaft to cause it to be turned, teeth on each interponent proportional to the numeral key controlling it, a totalizer, a master wheel driven by said interponents by said shaft, said interponents effective to complete each computing motion only at the end of a rotation of said shaft, and a pawl for positively arresting said shaft at the end of the rotation of any interponent.

3. In a combined typewriting and computing machine, the combination with typewriter numeral keys, of a power shaft constantly tending to turn, a master wheel, a drive shaft for said master wheel, an interponent for each numeral key between the said shafts, teeth on said interponents adapted to cause said master wheel shaft to be driven an amount proportional to the key depressed, a universal bar actuated by any depressed numeral key to release said power shaft to make it effective, and means connected to said power shaft to positively complete the depression of any key which has begun to compute and hold the key depressed until the computation is completely effected.

4. In a combined typewriting and computing machine, the combination with typewriter numeral keys, of a power shaft constantly tending to turn, a master wheel, a drive shaft for said master wheel, an interponent for each numeral key between the said shafts, teeth on said interponents adapted to cause said master wheel shaft to be driven an amount proportional to the key depressed, a universal bar actuated by any depressed numeral key to release said power shaft to make it effective, means connected to said power shaft to positively complete the depression of any key which has begun to compute and hold the key depressed until the computation is completely effected, and cams connected to each numeral key for positively moving its interponent into effective position by the key depression and for moving it out of effective position by the up-stroke of the key.

5. In a combined typewriting and computing machine, the combination with typewriter numeral keys of a universal rock shaft for said keys, an extension of said shaft for each of said keys, a pendant from each key comprising an extension adapted to actuate said rock shaft by its extension, a totalizer, a drive shaft for said totalizer, a shaft adapted to turn and drive said drive shaft and started by the depression of a numeral key, and a cam fast on said last named shaft adapted to overthrow said universal rock shaft, to lock the depressed key in effective position and hold said key locked while said shaft is turning.

6. In a combined typewriting and computing machine, the combination with typewriter numeral keys of a power shaft, a master wheel, a shaft for turning said master wheel, interponents sliding on said power shaft into and out of effective position with respect to said master wheel shaft, a cam frame connected to each numeral key for moving its interponent into and out of such effective position, a universal rock shaft for said keys, and guiding members fast on said rock shaft, adapted to guide said cam frames.

7. In a combined typewriting and computing machine, the combination with typewriter numeral keys of a universal rock shaft for said keys, rock arms on said universal shaft comprising cam stops by which said keys operate it, a power shaft under the control of said universal shaft, said rock arms comprising extensions adapted to lock said numeral keys in effective position, and means for rotating said universal shaft by said power shaft to make said extensions effective on said keys.

8. In a combined typewriting and computing machine, the combination with typewriter numeral keys and computing mechanism, of a power shaft for variably driving said computing mechanism, means for arresting said shaft at the end of each single full revolution thereof, means for starting said shaft by the depression of any numeral key, and means for holding any numeral key depressed until said shaft completes its revolution.

9. In a combined typewriting and computing machine, the combination with typewriter numeral keys and a computing master wheel started by the depression of any of said keys, of a shaft for said master wheel, a single pawl for positively arresting said shaft at the end of a computation, means for holding said pawl normally effective and for releasing it by the depression of any key, means for holding any key depressed while a computation is going on, and means for releasing the depressed key when a computation is finished.

10. In a combined typewriting and computing machine, the combination with typewriter numeral keys and a master wheel drive shaft, of a single pawl for arresting said drive shaft at the end of a computation, said pawl having an arresting face and a cam extending away from said arresting face, a ratchet wheel having ten teeth, arresting faces on said teeth to coöperate with the arresting face of said pawl, a cam face on each tooth coöperating with the cam face on the pawl, a strong spring tending to draw said pawl to effective positio and cause said cam faces to coöperate to complete the computing movement until positively arrested, means for making said pawl ineffective by the depression of a numeral key, and means for releasing said last-named means nearly a digit distance before the end of the turning of the master wheel, to permit said spring to make the pawl effective.

11. In a computing machine the combination with a drive shaft, of numeral keys, separate master wheel shafts each having computing connections, said shafts controlled by said keys, a power drive for said drive shaft, a pawl for positively arresting and adapted to complete a computing movement of said drive shaft, a separate detent for each of said master wheel shafts adapted to aline said shafts, and connections whereby all of said pawls and detents operate together.

12. In a combined typewriting and computing machine, the combination with a traveling typewriter carriage, of a totalizer, a master wheel effective on said totalizer at points determined by said carriage, typewriting numeral keys, a one-revolution shaft actuated by the depression of any numeral key to effect computation, said totalizer and said master wheel being normally disengaged, and means whereby said shaft first causes engagement between a master wheel and its totalizer and then is effective to drive said master wheel.

13. In a computing machine the combination with a plurality of totalizers, of a clutch for each totalizer for determining whether it shall add or subtract, means for separately operating said clutches, including a handle for operating one of said clutches, and means for reversing both of said clutches simultaneously, said last named means effective to automatically restore said clutches to their previous condition if released after being made effective.

14. In a computing machine the combination with a drive shaft and a driven shaft, of a single clutch member to determine whether the driven shaft shall be driven forwardly or backwardly, a link for operating said member, a device for guiding the free end of said link, a handle for shifting said device to make said clutch member effective forwardly or backwardly, a lever comprising a second device engaging said free end of said link, a pivot on which said second device swings, a handle for causing said second device to reverse the position of said clutch member, and a detent for holding one of said devices in its adjusted position.

15. In a combined typewriting and computing machine, the combination with typewriter numeral keys and a totalizer, of a master wheel for driving said totalizer but normally out of engagement therewith, a power-driven shaft, a driving member for each numeral key connected to said power driven shaft and under the control of said numeral keys, means operated by the depression of any numeral key for releasing said power shaft to turn to drive the driving member of that key, and means whereby said shaft when turning first moves said master wheel into engagement with said totalizer and then turns said master wheel to an extent determined by the driving member of the numeral key depressed.

16. In a combined typewriting and computing machine, the combination with typewriter numeral keys and a totalizer, of a master wheel for driving said totalizer but normally out of engagement therewith, a power driven shaft, a driving member for each numeral key connected to said power driven shaft and under the control of said numeral keys, means operated by the depression of any numeral key for causing said power shaft to turn to drive the driving member of that key, a cam connected to said driving shaft, and followers positively coöperating with said cam adapted to move said master wheel into and out of effective position.

17. In a combined typewriting and computing machine, the combination with typewriter numeral keys and a totalizer, of a master wheel for driving said totalizer but normally out of engagement therewith, a power driven shaft, a driving member for each numeral key connected to said power driven shaft and under the control of said numeral keys, means operated by the depression of any numeral key for causing said power shaft to turn to drive the driving member of that key, means whereby said shaft when turning first moves said master wheel into engagement with said totalizer and then turns said master wheel to an extent determined by the driving member of the numeral key depressed, and means operated by said driving shaft for causing the master wheel to be effective additively or subtractively at will.

18. In a combined typewriting and computing machine, the combination with typewriter numeral keys and a totalizer, of a master wheel for driving said totalizer but normally out of engagement therewith, a power driven shaft, a driving member for each numeral key connected to said power driven shaft and under the control of said numeral keys, means operated by the depression of any numeral key for causing said power shaft to turn to drive the driving member of that key, a cam connected to said driving shaft, followers positively coöperating with said cam adapted to move said master wheel into and out of effective position, and means operated by said driving shaft for causing the master wheel to be effective additively or subtractively at will.

19. In a combined typewriting and computing machine, the combination with typewriter numeral keys and a totalizer, of a master wheel for driving said totalizer but normally out of engagement therewith, a power driven shaft, a driving member for each numeral key connected to said power driven shaft and under the control of said numeral keys, means operated by the depression of any numeral key for causing said power shaft to turn to drive the driving member of that key, means whereby said shaft when turning first moves said master wheel into engagement with said totalizer and then turns said master wheel to an extent determined by the driving member of the numeral key depressed, said master wheel normally locked, and means concomitantly actuated by said power driven shaft for unlocking said master wheel and for relocking it at the end of a computation.

20. In a combined typewriting and computing machine, the combination with alphabet and typewriter numeral keys, of a traveling carriage, a totalizer, a master wheel for actuating said totalizer in denominations controlled by said carriage, a lug on said totalizer at a letter-space at which computing would be improper, and a power drive for said master wheel, said master wheel normally standing clear of said totalizer and adapted to be brought into engagement with said totalizer at the depression of a numeral key, said lug adapted to prevent said master wheel from engaging said totalizer.

21. In a combined typewriting and computing machine, the combination with a traveling typewriter carriage and typewriter numeral keys, of a master wheel for actuating said totalizer, connections whereby said master wheel is controlled by said numeral keys, a lug for preventing the actuation of said keys to effect a computation at a point where it is improper to compute a number, said master wheel normally free from said totalizer, a frame carrying said master wheel adapted to be swung to cause the master wheel to engage the totalizer to effect a computation, and a lug adapted to hold said master wheel and totalizer against relative travel while a numeral key is depressed, and adapted to coöperate with the first named lug to prevent the master wheel from engaging the totalizer when no computation should take place.

22. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn to effect a carry-over, and extensions of said carry-over devices forming Geneva locks with the peripheral surfaces on the computing wheels by which they are driven.

23. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn to effect a carry-over, extensions of said carry-over devices forming Geneva locks with the peripheral surfaces on the computing wheels by which they are driven, and a spring pressed bail engaging said carry-over devices and forming a universal detent for them adapted to be made ineffective by any device and to aline them all simultaneously in carrying over.

24. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn, extensions of said carry-over devices forming Geneva locks with the peripheral surfaces on the computing wheels by which they are driven, a detent normally holding all said computing wheels against turning, a tooth moving to and fro with the carry-over devices, adapted to strike said detent to release said computing wheels, and a locking device moving to and fro with said carry-over devices, adapted to lock all the computing wheels not engaged by the carry-over devices, or being turned.

25. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn to effect a carry-over, extensions of said carry-over devices forming Geneva locks with the peripheral surfaces on the computing wheels by which they are driven, a spring-pressed bail engaging said carry-over devices and forming a universal detent for them, adapted to be made ineffective by any device and to aline them all simultaneously in carrying over, and an alining device for positively alining said carry-over devices to reposition them when they leave the computing wheels after effecting a carry-over.

26. In a combined typewriting and computing machine, the combination with a traveling typewriter carriage having a letter-space movement and typewriter numeral keys, of a gang of computing wheels forming a totalizer, said wheels spaced into groups with a clear letter-space between two adjoining wheels, a separate carry-over device for each letter-space in which computing is likely to be done, including said clear space, said wheels traveling relatively to said devices, carry-over teeth forming part of said computing wheels, and extensions on the computing wheels below said clear spaces on which said carry-over teeth are mounted, said extensions making said carry-over teeth effective on the carry-over devices at the moment engaging the adjoining computing wheel beyond the clear space.

27. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn to effect a carry-over, extensions of said carry-over devices forming Geneva locks with the peripheral surfaces on the computing wheels by which they are driven, said carry-over devices symmetrically constructed whereby they may be effective for either addition or subtraction, a single spring-pressed universal detent engaging said carry-over device for alining them in the act of adding or subtracting, and a pair of alining devices adapted to positively realine said carry-over devices preparatory to a second carry-over when moving away from the computing wheels.

28. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn, extensions of said carry-over devices forming Geneva locks with the peripheral surfaces on the computing wheels by which they are driven, dial-wheels constantly engaging said computing wheels, and gears forming part of said dial-wheels, having teeth only between the dial numerals and engaging the corresponding teeth on the computing wheels.

29. In a computing machine, the combination with computing wheels, comprising teeth and peripheral surfaces, of carry-over devices therefor, adapted to be moved into and out of mesh with said wheels, each carry-over device comprising a tooth extending into the path of one only of said computing wheel teeth, other teeth on said carry-over device adapted to engage the teeth on the adjoining computing wheel, a pivot common to all said carry-over devices, about which they turn, extensions of said carry-over devices forming Geneva locks with the peripheral surfaces on the computing wheels by which they are driven, a detent normally holding all said computing wheels against turning, a tooth moving to and fro with the carry-over devices, adapted to strike said detent to release said computing wheels, a locking device moving to and fro with said carry-over devices, adapted to lock all the computing wheels not engaged by the carry-over devices, or being turned, and a rack coöperating with said tooth to prevent relative travel of the carry-over devices and the computing wheels while they are engaged with each other.

30. The combination with a totalizer, comprising computing wheels traveling relatively to a master wheel, a frame on which said master wheel is mounted, pivots about which said frame swings, carry-over devices mounted in said frame and swinging with said master wheel, a fixed bar on said frame adapted to engage the computing wheels to the right of the master wheel to hold them against rotation, a tooth fast on said frame, a coöperating rack associated with said computing wheels, a universal bail holding said computing wheels against turning and adapted to be moved to ineffective position by said tooth, and carry-over devices to the left of the master wheel adapted to hold said computing wheels against turning while they are engaged therewith.

31. In a combined typewriting and computing machine, the combination with typewriter numeral keys and a master wheel driving shaft, of a power-driven shaft, an interponent on said power-driven shaft for each numeral key, adapted to be shifted into effective position by depression of its numeral key, a gear forming part of said interponent having a number of teeth proportional to the numeral key controlling it, a corresponding gear wheel on said master wheel drive-shaft by which each interponent drives said drive-shaft, a Geneva lock member associated with each master wheel drive-shaft gear, and a Geneva lock member forming part of each interponent adapted to hold said master wheel shaft locked whenever said interponent is shifted to effective position, said interponent Geneva member cut away to allow said proportional teeth to turn the master wheel drive-shaft after being so shifted.

32. In a combined typewriting and computing machine, the combination with typewriter numeral keys and a master wheel driving shaft, of a power-driven shaft, an interponent on said power-driven shaft for each numeral key, adapted to be shifted into effective position by depression of its numeral key, a gear forming part of said interponent having a number of teeth proportional to the numeral key controlling it, a corresponding gear wheel on said master wheel drive-shaft by which each interponent drives said drive-shaft, a Geneva lock member associated with each master wheel drive-shaft gear, a Geneva lock member forming part of each interponent adapted to hold said master wheel shaft locked whenever said interponent is shifted to effective position, said interponent Geneva member cut away to allow said proportional teeth to turn the master wheel drive-shaft after being so shifted, a pawl adapted to hold said master wheel drive-shaft, said power-driven shaft adapted to be turned a single revolution at each depression of a numeral key and means for moving said pawl to effective position before said master wheel drive-shaft is released from the Geneva locking member which is effective at the end of a computation.

33. In a combined typewriting and computing machine, the combination with typewriter numeral keys and a master wheel driving shaft, of a power-driven shaft, an interponent on said power-driven shaft for each numeral key, adapted to be shifted into effective position by depression of its numeral key, a gear forming part of said interponent having a number of teeth proportional to the numeral key controlling it, a corresponding gear wheel on said master wheel drive-shaft by which each interponent drives said drive-shaft, a Geneva lock member associated with each master wheel drive-shaft gear, a Geneva lock member forming part of each interponent adapted to hold said master wheel shaft locked whenever said interponent is shifted to effective position, said interponent Geneva member cut away to allow said proportional teeth to turn the master wheel drive-shaft after being so shifted, said proportional teeth effective at the ending of a revolution of the power shaft, a pawl adapted to hold said master wheel drive-shaft, said power-driven shaft adapted to be turned a single revolution at each depression of a numeral key, and means for moving said pawl to effective position before said master wheel drive-shaft is released from the Geneva locking member which is effective at the end of a computation.

34. In a combined typewriting and computing machine, the combination with typewriter numeral keys and a master wheel drive-shaft, of a device for temporarily storing power to effect a number of computations, a motor adapted to intermittently be automatically started to bring said source of power up to its normal effectiveness, connections whereby the numeral keys control the master wheel drive-shaft through said source of power, and a lock adapted to hold said numeral keys against actuation whenever said source of power falls below a certain standard.

35. In a combined typewriting and computing machine, the combination with typewriter numeral keys and a master wheel drive-shaft, of a device for temporarily storing power to effect a number of computations, a motor adapted to intermittently be automatically started to bring said source of power up to its normal effectiveness, connections whereby the numeral keys control the master wheel drive-shaft through said source of power, a lock adapted to hold said numeral keys against actuation whenever said source of power falls below a certain standard, and means whereby said motor is automatically disconnected when said source of power is brought up to its normal state of effectiveness.

36. In a combined typewriting and computing machine, the combination with typewriter numeral keys and a traveling typewriter carriage, of a totalizer comprising an array of computing wheels, a typewriter tabulating rack for said carriage, a bar adjacent said rack, cams adjustable along said bar for connecting said keys to operate said computing wheels, a separate cam adjustable with any connection-controlling cam along the said bar, and a single fastener for holding two of said cams in position on said bar.

37. In a combined typewriting and computing machine, the combination with typewriter numeral keys, a typewriter carriage and a typewriter case shift, of computing wheels adapted to be under the control of said typewriter numeral keys, a manually adjustable handle for determining whether said keys shall be effective to control said wheels or not, means associated with said carriage for making said connection effective or ineffective by the travel of said carriage, subject to the domination of said manual control, and a connection from said case shift for making said connection ineffective if said numeral keys are effective to write anything except numerals.

38. In a combined typewriting and computing machine, the combination with a power shaft adapted to make a single revolution at each computation, of a totalizer comprising computing wheels, a master wheel normally out of engagement with said totalizer but adapted to engage said totalizer to turn a computing wheel therein, a detent for said master wheel shaft moved out of mesh with said master wheel shaft while a computation is going on, but automatically made effective on the completion of a computation, a cam on said power shaft for so operating said detent, and means whereby said power shaft moves said master wheel into engagement with the totalizer before said detent is made ineffective, and moves it out of engagement therewith after said detent is again effective.

39. In a computing machine, the combination with a reversing gear, of a link shiftable to operate said reversing gear, a handle comprising a device for moving said link to make it thus operative, and a second handle comprising a second device also engaging said link, adapted to be effective on said link oppositely to said first device while the setting of said first device remains unchanged.

40. In a combined typewriting and computing machine, the combination with typewriter numeral keys and a line-locking bail therefor, of a computing mechanism controlled by said keys, a motor for said computing mechanism, and connections whereby said motor when ineffective makes said line-locking bail effective.

41. In a computing machine, the combination with an electric motor, of a contact controlling said motor, a pivoted tappet controlling said contact, a single detent adapted to set said tappet in its effective or ineffective position, and a connection from said tappet adapted to operate the usual line-locking mechanism of the typewriter.

42. The combination with a totalizer, of a master wheel normally out of engagement therewith, computing wheels forming part of said totalizer, an alining device universal to said computing wheels, a lug associated with said master wheel adapted to move said alining device to ineffective position, a bar adapted to aline said computing wheels to the right of the master wheel and moving into and out of effective position with said master wheel, carry-over devices for said computing wheels moving into and out of engagement therewith, and an alining device for said carry-over devices adapted to allow them to be moved to effect a carry-over and to restore said devices to normal position when said master wheel moves away from said computing wheel.

43. In a combined typewriting and computing machine, the combination with a one-revolution drive-shaft, of a tappet normally holding said shaft at rest, typewriter numeral keys, means for moving said tappet to inoperative position by the depression of any numeral key, a main drive-shaft, a tappet for said main drive-shaft controlled by said one-revolution shaft, a master wheel shaft, a detent holding said master wheel shaft alined, also under the control of said one-revolution shaft, a master wheel normally out of engagement with the computing mechanism, and means for moving said master wheel into engagement with the computing mechanism by said one-revolution shaft.

44. In a computing machine, the combination with numeral keys and a shaft normally at rest, of a detent holding said shaft, a latch universal to said numeral keys for releasing said detent, a cam fast on said shaft for holding said universal latch in ineffective position until said shaft practically completes its revolution, and computing mechanism driven by said shaft.

45. In a computing machine having computing wheels and a master wheel normally not in mesh, the combination of means for rapidly bringing the master wheel into mesh readily with one of said computing wheels, and a stop separate from the master wheel for arresting the master wheel before it strikes said computing wheel.

46. In a computing machine adapted to compute numbers spaced from each other by punctuation points, the combination with a master wheel and a totalizer comprising computing wheels normally out of engagement with said master wheel, of means for preventing said master wheel from engaging said totalizer at such punctuation points.

47. In a combined typewriting and computing machine, the combination with typewriter numeral keys and a locking bail therefor, of a power drive including a spring, a motor automatically driven to rewind said spring whenever the spring is partly run down, an electric circuit controlling said motor, said circuit having a switch for closing and opening it, and means for making said lock effective on said keys when said motor is rewinding said spring.

48. In a combined typewriting and computing machine, the combination with a spring motor, of an electric motor for automatically rewinding it, a switch for controlling said motor, and a sleeve operated by the unwinding of said spring for controlling said switch.

49. In a combined typewriting and computing machine, the combination with a spring motor, of an electric motor for automatically rewinding it, a switch for controlling said motor, a sleeve operated by the unwinding of said spring for controlling said switch, and connections whereby said sleeve operates said switch with a snap action.

50. In a combined typewriting and computing machine, the combination with an electric terminal having a spring action, of a pawl controlling said terminal, a spring for said pawl, a driving spring for the mechanism, and a lever controlled by said driving spring adapted to snap said pawl to control said terminal.

51. In a combined typewriting and computing machine, the combination with typewriter numeral keys and a locking bail therefor, of an electric motor, terminals for said electric motor, a snap lever controlling said terminals, a link having a lost motion connection with said snap lever, a bell-crank connected to said link, a rock arm operating said bail, and a pin-and-slot connection between said bell-crank and said bail.

52. In a combined typewriting and computing machine, the combination with typewriter numeral keys and a locking bail therefor, of a shaft fast to said bail on which it rocks, a rock arm pivoted on said shaft, tongues preventing relative movement of said rock shaft and said rock arm in one direction, a coil spring holding said tongues normally in contact and adapted to operate said bail, and a drive spring operating said rock arm.

53. In a combined typewriting and computing machine, the combination with a source of power tending to drive said machine, of a shaft on which said source of power is effective, connections for locking the machine if computation is improperly undertaken, and a handle on said shaft for rotating said shaft backward against the tension of said source of power, the connections being such that said backward rotation will restore the parts to their normal position.

54. In a combined typewriting and computing machine, the combination with a source of power tending to drive said machine, of a shaft on which said source of power is effective, connections for locking the machine if computation is improperly undertaken, a handle on said shaft for rotating said shaft backwardly against the tension of said source of power, the connections being such that said backward rotation will restore the parts to their normal position, computing wheels and a master wheel forming part of said computing connections, a ratchet wheel geared to said master wheel, a pawl normally holding said ratchet wheel against turning to effect a computation, and cam surfaces on said pawl and ratchet wheel to permit turning in a backward direction.

55. In a combined typewriting and computing machine, the combination with a source of power tending to drive said machine, of a shaft on which said source of power is effective, connections for locking the machine if computation is improperly undertaken, a handle on said shaft for rotating said shaft backwardly against the tension of said source of power, the connections being such that said backward rotation will restore the parts to their normal position, computing wheels and a master wheel forming part of said computing connections, a ratchet wheel geared to said master wheel, a pawl normally holding said ratchet wheel against turning to effect a computation, cam surfaces on said pawl and ratchet wheel to permit turning in a backward direction, a detent for said master wheel, and means positively moved by said power shaft for simultaneously making said detent and said pawl effective and ineffective.

56. In a computing machine, the combination with a traveling carriage, a second traveling carriage, a link for connecting said carriages, a pawl pivotally and adjustably mounted along said link, a lug on said first named carriage adapted to be intercepted by said pawl to carry said pawl and link along with it, a tappet roller for swinging said pawl on its pivot on said link to carry it clear of said lug, a spring between said pawl and said link normally holding said pawl effective, a grooved device comprising a scale on said carriage, and an extension on said lug carrying tongues adapted to engage said grooves and a lock to hold said lugs along said scale.

57. In a combined typewriting and computing machine, the combination with numeral keys and a power device for driving said combined machine, of a pawl normally holding said power device, a universal pawl for releasing said first named pawl, a shelf on said universal pawl, a platen shift forming part of said machine, and a link connected to said platen shift adapted to engage said shelf to hold said pawl ineffective.

58. In a combined typewriting and computing machine, the combination with numeral keys and a power device for driving said combined machine, of a pawl normally holding said power device, a universal pawl for releasing said first named pawl, a shelf on said universal pawl, a platen shift forming part of said machine, a link connected to said platen shift adapted to engage said shelf to hold said pawl ineffective, a second link adapted to engage said shelf, and a handle for manually making said last-named link effective or ineffective.

59. In a combined typewriting and computing machine, the combination with a reversing gear, of an interponent, two levers adapted to be effective on said reversing gear, means for determining on which of said levers said interponent shall be effective, and numeral key-controlled means for making said interponent effective.

60. A carry-over member comprising three plates united to form a unitary member, one plate having teeth adapted to mesh with teeth on an adjoining computing wheel, another member having three Geneva-locking surfaces adapted to mesh with the other adjoining computing wheel, each surface according to the computing state, three notches forming part of said plate adapted to coöperate with a detent, and the third member comprising a tooth adapted to be driven by a carry-over tooth on said last-named computing wheel.

61. A carry-over member comprising three plates united to form a unitary member, one plate having teeth adapted to mesh with teeth on an adjoining computing wheel, another member having three Geneva-locking surfaces adapted to mesh with the other adjoining computing wheel, each surface according to the computing state, three notches forming part of said plate adapted to coöperate with a detent, the third member comprising a tooth adapted to be driven by a carry-over tooth on said last-named computing wheel, and three notches on said last-named element alined with the three notches on the second-named element.

62. The combination with computing wheels and a universal detent thereof, of a carry-over mechanism adapted to be moved adjacent said computing wheels but normally removed radially therefrom, an abutment forming part of said carry-over mechanism adapted to release said universal detent, a locking bar forming part of said carry-over mechanism, and a plurality of Geneva-locking members forming another part of said carry-over mechanism.

63. The combination with computing wheels and carry-over devices thereof normally removed radially therefrom, of alining bars positively holding said carry-over devices alined when so removed, teeth forming part of said carry-over members, a universal detent coöperating with said teeth whether removed from or in contact with said computing wheels, and carry-over teeth on said computing wheels adapted to initiate a carry-over which shall be completed by said universal detent.

64. A set of carry-over devices each adapted to occupy any one of three positions, one being the position which it normally occupies and to which it is moved whenever in normal position, said normal position being axially removed from the computing wheels on which it is effective, detent teeth on each carry-over device, and a universal detent adapted to coöperate with all of said last-named teeth, to hold the carry-over devices individually in either addition, subtraction or neutral position.

65. A carry-over member comprising three plates united to form a unitary member, one plate having teeth adapted to mesh with teeth on an adjoining computing wheel, another member having three Geneva-locking surfaces adapted to mesh with the other adjoining computing wheel, each surface according to the computing state, three notches forming part of said plate adapted to coöperate with a detent, the third member comprising a tooth adapted to be driven by a carry-over tooth on said last-named computing wheel, and a rack-bar associated with said computing wheels adapted to determine where the carry-over device shall stand during the carry-over operation.

66. A carry-over member comprising three plates united to form a unitary member, one plate having teeth adapted to mesh with teeth on an adjoining computing wheel, another member having three Geneva-locking surfaces adapted to mesh with the other adjoining computing wheel, each surface according to the computing state, three notches forming part of said plate adapted to coöperate with a detent, the third member comprising a tooth adapted to be driven by a carry-over tooth on said last-named computing wheel, three notches on said last-named element alined with the three notches on the second-named element, and a rack-bar associated with said computing wheels adapted to determine where the carry-over device shall stand during the carry-over operation.

67. The combination with computing wheels and a universal detent thereof, of a carry-over mechanism adapted to be moved adjacent said computing wheels but normally removed radially therefrom, an abutment forming part of said carry-over mechanism adapted to release said universal detent, a locking bar forming part of said carry-over mechanism, a plurality of Geneva-locking members forming another part of said carry-over mechanism, and a rack-bar associated with said computing wheels adapted to determine where the carry-over device shall stand during the carry-over operation.

68. The combination with computing wheels and carry-over devices thereof normally removed radially therefrom, of alining bars positively holding said carry-over devices alined when so removed, teeth forming part of said carry-over members, a universal detent coöperating with said teeth whether removed from or in contact with said computing wheels, carry-over teeth on said computing wheels adapted to initiate a carry-over which shall be completed by said universal detent, and a rack-bar associated with said computing wheels adapted to determine where the carry-over device shall stand during the carry-over operation.

69. In a combined typewriting and computing machine, the combination with typewriter numeral keys and key-levers therefor, of indexing devices operated by said keys, said indexing devices comprising axially slidable wheels, a cam supported by each key-lever for moving each wheel, a link extending from said cam to its key-lever, an arm pivoted on said key-lever on which said link is pivoted, and a set-screw on each side of the pivot of said arm adapted to rock said arm to adjust the cam.

70. The combination with a rock-shaft, of a plurality of key-controlled indexing devices adjacent said rock-shaft, an arm fast to said rock-shaft for each indexing device, a computing machine power-drive under the control of said rock-shaft, a bar for each indexing device adapted to intercept its rock-arm whenever computing is being done by its key, and a preventing lug for each indexing device fast on said rock-shaft adapted to ride under every bar not so depressed and lock every indexing device against operation except the one depressed at the moment.

71. The combination with a totalizer, of a master wheel having a relative traveling movement with respect thereto, said master-wheel also movable axially into and out of mesh with said totalizer, a power-drive for said master wheel, a short shaft connecting said master wheel to said power-drive, and two universal joints, one at each end of said shaft, for driving said master wheel.

72. In a combined typewriting and computing machine, the combination with a power drive constantly tending to drive said machine, of a pinion through which said drive is effective, a shaft on which said pinion is journaled, a collar loose on said shaft, a spring coiled around said shaft and fast to said shaft and said collar, said collar adapted to form a positive tongue and groove connection with said pinion, but slidable on said shaft to break said connection to permit the tension of the encircling spring to be adjusted, and a pawl normally holding said shaft and adapted to be moved to ineffective position to release said shaft, so that the shaft is turned by said pinion through the spring, and when the pawl is moved again to effective position, the shaft will be arrested thereby and the shock of arresting the power drive will be absorbed by said spring.

73. In a computing machine, the combination with a power shaft, of a series of mutilated gears movably splined on said shaft, numeral keys for selectively moving said gears from their normal ineffective position to an effective position, a computing shaft driven by any gear when so moved, a pawl holding said computing shaft, means for moving said pawl to ineffective position by rotation of said first shaft, said movable gears all having their final teeth in a single plane, and means for moving said pawl to effective position concomitantly with the end of the turning of said computing shaft by the final tooth of any of said gears.

74. In a computing machine, the combination with a power shaft, of a series of mutilated gears movable on said shaft, numeral keys for moving said gears from their normal ineffective position to an effective position, a computing shaft driven by any gear when so moved, a pawl holding said computing shaft, means for moving said pawl to ineffective position by rotation of said first shaft, said movable gears all having their final teeth in a single plane, teeth connected to said computing shaft having one face largely cut away, on which teeth said pawl is effective, a spring tending to draw said pawl into engagement with said teeth to position the shaft by the cut-away tooth faces, and a cam on said first-named shaft moving said pawl to ineffective position at the beginning of a computation, and adapted to release said pawl to permit it to be drawn to effective position by said spring a large fraction of a digit before the computing shaft is to be arrested.

75. In a computing machine, the combination with a driving shaft, of mutilated gears splined thereon, a computing shaft adapted to be variably driven by said mutilated gears, a pawl normally holding said computing shaft, a cam positively connected to said driving shaft for moving said pawl to ineffective position early in any turning of said driving shaft, said mutilated gears having their final teeth all in one plane, and means for moving said pawl to effective position when said computing shaft ceases to be turned by any of said final teeth.

76. In a computing machine, the combination with a driving shaft, of mutilated gears splined thereon, a computing shaft adapted to be variably driven by said mutilated gears, a pawl normally holding said computing shaft, a cam positively connected to said driving shaft for moving said pawl to ineffective position early in any turning of said driving shaft, said mutilated gears having their final teeth all in one plane, and means for moving said pawl to effective position when said computing shaft ceases to be turned by any of said final teeth, said pawl moving to effective position a large fraction of a digit space before said computing shaft ceases to be driven by the final teeth.

77. In a computing machine, the combination with a power shaft and mutilated gears thereon, of a computing shaft, means for individually and variably driving said computing shaft from said power shaft through said gears, normally ineffective Geneva locks holding said computing shaft whenever the power shaft is turning but is ineffective to turn the computing shaft, a pawl normally effective to hold the computing shaft, means for making said pawl ineffective whenever any Geneva lock becomes effective, and means for making said pawl effective whenever any mutilated gear ceases to turn the computing shaft after having begun to turn it.

78. In a computing machine, the combination with a power shaft and mutilated gears thereon, of a computing shaft, means for individually and variably driving said computing shaft from said power shaft through said gears, normally ineffective Geneva locks holding said computing shaft whenever the power shaft is turning, but is ineffective to turn the computing shaft, a pawl normally effective to hold the computing shaft, means for making said pawl ineffective whenever any Geneva lock becomes effective, a cam fast on said power shaft for moving said pawl to ineffective position when any Geneva lock becomes effective, and for releasing the pawl when any gear ceases to turn the computing shaft, and a spring making said pawl effective when released from said shaft.

79. In a computing machine, the combination with a drive shaft and a driven shaft, of a single clutch member to determine whether the driven shaft shall be driven forwardly or backwardly, a link for operating said member, a device for guiding the free end of said link, a handle for shifting said device to make said clutch member effective forwardly or backwardly, a lever comprising a second device engaging said free end of said link, a pivot on which said second device swings, a handle for causing said second device to reverse the position of said clutch member, a detent for holding one of said devices in its adjusted position, a traveling carriage forming part of said computing machine, numeral keys, an interponent shiftable by said carriage to be selectively effective on one of said devices, and connections whereby the depression of a numeral key may cause said interponent to be effective on the device as selected by the carriage.

80. In a computing machine, the combination with a reversing gear, of a carriage, an interponent controlled by said carriage, levers for selectively shifting said reversing gear and adapted to be selected by said interponent as positioned by the carriage, and numeral-key-controlled means for causing the reversing gear to be shifted by the effective lever.

81. In a computing machine, the combination with a traveling carriage and numeral keys, of a member rocked at the depression of any numeral key, a reversing gear, a lever for shifting said reversing gear by said rocking member, and an interponent controlled by said carriage for selectively making said lever effective according to the position of the carriage.

82. In a computing machine, the combination with a traveling carriage and numeral keys, of a member rocked at the depression of any numeral key, a reversing gear, a plurality of levers for selectively shifting said reversing gear, an interponent shiftable by said carriage, and connections whereby said interponent is caused to operate the selected lever by said rocking member.

83. In a computing machine, the combination with a shaft constantly under tension tending to turn it, of a pawl normally holding said shaft against turning, a key-operated universal bar for releasing said pawl, a releaser slidable near said shaft to so release said pawl, and a cam on said shaft moved to effective position to make said releaser ineffective after the shaft has turned beyond the point at which said pawl can hold it.

84. In a computing machine, the combination with a shaft constantly under tension tending to turn it, of a lug on said shaft, a pawl for holding said shaft by said lug and normally held in effective position, a releaser for shifting said pawl to ineffective position, a normally ineffective cam on said shaft, and an extension of said cam overlying said releaser and comprising a surface concentric with said shaft to shift the releaser to ineffective position, and to hold it ineffective until said lug engages said pawl.

85. In a computing machine, the combination with a shaft constantly under tension tending to turn it, of a lug on said shaft, a pawl for holding said shaft by said lug and normally held in effective position, a releaser for shifting said pawl to ineffective position, a normally ineffective cam on said shaft, an extension of said cam overlying said releaser and comprising a surface concentric with said shaft to shift the releaser to ineffective position, and to hold it ineffective until said lug engages said pawl, a universal shaft for shifting said releaser, numeral keys, a separate lug on said universal shaft for each numeral key and operated by its depression, a bar by which each numeral key operates its lug, and an extension of said universal shaft adapted to ride under every numeral-key lug not depressed, and thereby lock every undepressed key against depression while said universal shaft is shifted by any depressed key.

86. In a computing machine, the combination with a driving shaft constantly under tension tending to turn it, of a lug on said shaft, a pawl for holding said shaft by said lug and normally held in effective position, a releaser for shifting said pawl to ineffective position, a normally ineffective cam on said shaft, an extension of said cam overlying said releaser and comprising a surface concentric with said shaft to shift the releaser to said position, and to hold it ineffective until said lug engages said pawl, a universal shaft for shifting said releaser, numeral keys, a lug on said universal shaft for each numeral key, a bar by which each numeral key operates its lug, an extension of said universal shaft adapted to ride under every numeral-key lug not depressed, and thereby lock every undepressed key against depression while said universal shaft is shifted by any depressed key, an arm fast on said universal shaft, and a second cam on said driving shaft normally in ineffective position, but riding under said arm to hold said universal shaft in its turned position while the first-named shaft is making a large part of its turning.

87. In a computing machine, the combination with a driving shaft constantly under tension tending to turn it, of a lug on said shaft, a pawl for holding said shaft by said lug and normally held in effective position, a releaser for shifting said pawl to ineffective position, a normally ineffective cam on said shaft, an extension of said cam overlying said releaser and comprising a surface concentric with said shaft to shift the releaser to said position, and to hold it ineffective until said lug engages said pawl, a universal shaft for shifting said releaser, numeral keys, a lug on said universal shaft for each numeral key, a bar by which each numeral key operates its lug, an extension of said universal shaft adapted to ride under every numeral-key lug not depressed, and thereby lock every undepressed key against depression while said universal shaft is shifted by any depressed key, an arm fast on said universal shaft, and a second cam on said driving shaft normally in ineffective position, but riding under said arm to hold said universal shaft in its turned position while the first-named shaft is making a large part of its turning, the connections being such that the lug of the depressed numeral key is held by said extension to hold the key depressed while the last-named cam is effective.

88. In a computing machine, the combination with a drive shaft normally under tension tending to turn it, of a series of numeral keys, a shaft universal to said keys, a lug connected to each key adapted to rock said universal shaft, an arm on said universal shaft for each lug to enable it to be rocked thereby, a lug on said universal shaft adapted to be carried under any numeral-key lug while in the normal position thereof to lock said lug against movement, a pawl normally holding said drive shaft, a releaser for said pawl, and an arm on said universal shaft connected to said pawl to operate it.

89. In a computing machine, the combination with a drive shaft normally under tension tending to turn it, of a series of numeral keys, a shaft universal to said keys, a lug connected to each key, adapted to rock said universal shaft, an arm on said universal shaft for each lug, to enable it to be rocked thereby, a lug on said universal shaft adapted to be carried under any numeral-key lug while in the normal position thereof to lock said lug against movement, a pawl normally holding said drive shaft, a releaser for said pawl, an arm on said universal shaft connected to said pawl to operate it, another arm fast on said universal shaft, and a cam on said drive shaft adapted to ride under said last-named arm and hold said universal shaft in its actuated position during a large part of the turning of the tension shaft.

90. In a computing machine, the combination with a drive shaft normally under tension tending to turn it, of a series of numeral keys, a shaft universal to said keys, a lug connected to each key adapted to rock said universal shaft, an arm on said universal shaft for each lug to enable it to be rocked thereby, a lug on said universal shaft adapted to be carried under any numeral-key lug while in the normal position thereof to lock said lug against movement, a pawl normally holding said drive shaft, a releaser for said pawl, an arm on said universal shaft connected to said pawl to operate it, another arm fast on said universal shaft, a cam on said drive shaft adapted to ride under said last-named arm and hold said universal shaft in its actuated position during a large part of the turning of the tension shaft, and a cam on said drive shaft normally ineffective, but effective during the turning of the drive shaft to move said releaser to ineffective position while still connected to said universal shaft.

91. In a computing machine, the combination with a driving shaft, of a gear splined on said driving shaft, a numeral key, a gear adapted to be driven by said first-named gear but normally out of mesh therewith, a bar connected to said numeral key adapted to shift said splined gear to meshing position, means constantly tending to turn said driving shaft, a universal shaft, an arm on said universal shaft for said numeral key, a lug on said numeral key for operating said universal shaft, a pawl normally holding the driving shaft, and a releaser operated by said universal shaft for releasing said pawl.

92. In a computing machine, the combination with a master wheel, of a shaft for driving said master wheel always turning in one direction, a pawl for holding said driving shaft against turning, a power shaft, numeral keys, connections whereby the depression of a numeral key positively connects said power shaft to said drive shaft to turn it to an amount dependent on the key depressed, and a finger-piece adapted to rotate said drive shaft backwardly if it comes to rest before the completion of its turning under the influence of the depressed numeral key, the connection being such that the finger-piece returns the numeral key to normal position and restores the shafts to the position they occupied before the depression of that key.

93. In a computing machine, the combination with a master-wheel shaft, of a drive shaft therefor, a pawl-and-ratchet device effective on said drive shaft to positively arrest it at the end of a digit's turning and to cam it to the end of such a turning, a power shaft, numeral keys, gear-and-lock connections between said power shaft and said drive shaft, whereby the depression of a numeral key connects said shafts positively together, a pawl normally holding said power shaft, and a finger-piece adapted to rotate the drive shaft backwardly after it has been partly rotated by the depression of a numeral key and to again put said power shaft under the control of its pawl.

94. In a computing machine, the combination with a master wheel adapted to rotate in either direction, of a drive shaft therefor always rotating in the same direction, a ratchet wheel connected to said drive shaft, a pawl effective on said ratchet wheel to hold it, and having a cam face coöperating with the teeth of said ratchet wheel to cam said ratchet wheel to the place at which it should properly be arrested, a power shaft, numeral keys adapted to positively connect said power shaft to said drive shaft, a pawl normally holding said power shaft, and a finger-piece adapted to rotate said drive shaft backwardly after it has been partly rotated by a numeral key depression, to put said power shaft again under the control of its pawl, and to bring the drive shaft back to the position it occupied before the depression of that numeral key, thereby rotating the master wheel backward to eliminate the digit computed inaccurately by the depressed numeral key.

95. The combination with a master-wheel shaft, of a drive shaft therefor, connections between said shafts whereby the master wheel may either be turned by said drive shaft or be disconnected therefrom, a computing shaft forming part of said connections, a detent for holding said master-wheel shaft, a pawl holding the computing shaft when the computing shaft is at rest, and means for making said detent positively effective when the pawl is holding the computing shaft and positively ineffective when the computing shaft is turned.

GUSTAVE O. DEGENER.

Witnesses;
W. O. WESTPHAL,
JOHN F. RULE.